US009241172B2

(12) United States Patent
Kato et al.

(10) Patent No.: US 9,241,172 B2
(45) Date of Patent: Jan. 19, 2016

(54) MOVING IMAGE ENCODING AND DECODING DEVICE

(75) Inventors: Sadaatsu Kato, Toshima-ku (JP);
Choong Seng Boon, Yokohama (JP);
Yoshinori Suzuki, Saitama (JP);
Sandeep Kanumuri, San Jose, CA (US)

(73) Assignee: NTT DOCOMO, INC., Tokyo (JP)

( * ) Notice: Subject to any disclaimer, the term of this patent is extended or adjusted under 35 U.S.C. 154(b) by 919 days.

(21) Appl. No.: 13/294,145

(22) Filed: Nov. 10, 2011

(65) Prior Publication Data

US 2012/0069905 A1 Mar. 22, 2012

Related U.S. Application Data

(63) Continuation of application No. PCT/JP2010/056378, filed on Apr. 8, 2010.

(30) Foreign Application Priority Data

May 11, 2009 (JP) .................................. 2009-114646

(51) Int. Cl.
*H04N 19/635* (2014.01)
*H04N 19/573* (2014.01)
(Continued)

(52) U.S. Cl.
CPC ........... *H04N 19/573* (2014.11); *H04N 19/196* (2014.11); *H04N 19/463* (2014.11); *H04N 19/51* (2014.11); *H04N 19/523* (2014.11); *H04N 19/70* (2014.11)

(58) Field of Classification Search
CPC .... H04N 1/417; H04N 19/103; H04N 19/105
See application file for complete search history.

(56) References Cited

U.S. PATENT DOCUMENTS 7,903,737 B2 * 3/2011 Martinian et al. ....... 375/240.12
8,243,803 B2 8/2012 Etoh et al.
(Continued)

FOREIGN PATENT DOCUMENTS

CN 101208957 A 6/2008
EP 1881707 A1 1/2008
(Continued)

OTHER PUBLICATIONS

Okubo, Kadano, Kikuchi and Suzuki, H.264/AVC Textbook, pp. 113-119, Kabushiki Kaisha Impress, 2004 (with English translation).
(Continued)

*Primary Examiner* — Sath V Perungavoor
*Assistant Examiner* — Clifford Hilaire
(74) *Attorney, Agent, or Firm* — Brinks Gilson & Lione

(57) ABSTRACT

A moving picture encoding device includes a prediction signal generation method controller that determines, for each of a plurality of target blocks, a processing method. The processing method can be performed on one of a plurality of reference pictures for generating a prediction signal for each respective target block. The prediction signal generation method controller also determines a motion vector and a reference picture for each respective target block by performing motion prediction. The moving picture encoding device also includes a prediction signal generator and an encoder. The prediction signal generator generates the prediction signal for the respective target block by performing processing on the respective reference picture based on the respective processing method, and the encoder encodes information on the respective processing method on each respective reference picture together with a reference list number identifying the respective reference picture and motion vector information of every target block.

17 Claims, 45 Drawing Sheets

(51) Int. Cl.
*H04N 19/70* (2014.01)
*H04N 19/196* (2014.01)
*H04N 19/463* (2014.01)
*H04N 19/51* (2014.01)
*H04N 19/523* (2014.01)
*H04N 19/82* (2014.01)

(56) References Cited

U.S. PATENT DOCUMENTS

| | | |
|---|---|---|
| 8,275,036 B2 | 9/2012 | Etoh et al. |
| 8,391,364 B2 | 3/2013 | Etoh et al. |
| 8,488,671 B2 | 7/2013 | Etoh et al. |
| 2004/0247190 A1 | 12/2004 | Hagai et al. ............... 382/238 |
| 2005/0105617 A1 | 5/2005 | Chono ................. 375/240.16 |
| 2005/0129320 A1* | 6/2005 | Koto ......................... 382/239 |
| 2005/0185713 A1* | 8/2005 | Winger et al. ......... 375/240.12 |
| 2006/0294171 A1* | 12/2006 | Bossen ............. H04N 19/139 708/300 |
| 2007/0019724 A1* | 1/2007 | Tourapis et al. ........ 375/240.12 |
| 2007/0058718 A1* | 3/2007 | Shen et al. ............. 375/240.12 |
| 2007/0153905 A1 | 7/2007 | Chujoh et al. ......... 375/240.16 |
| 2008/0247467 A1* | 10/2008 | Rusanovskyy ........... H04N 7/12 375/240.16 |
| 2010/0195723 A1* | 8/2010 | Ikai ..................... H04N 19/197 375/240.12 |
| 2012/0328019 A1 | 12/2012 | Etoh et al. |

FOREIGN PATENT DOCUMENTS

| | | | |
|---|---|---|---|
| EP | 2023639 A1 | 2/2009 | |
| JP | 2003-169337 | 6/2003 | .............. H04N 7/32 |
| JP | 2003-319398 | 11/2003 | .............. H04N 7/32 |
| JP | 2004-007377 | 1/2004 | .............. H04N 7/32 |
| JP | 2008-311781 | 12/2008 | |
| WO | WO 03/047270 A1 | 6/2003 | |
| WO | WO 2005/034517 A1 | 4/2005 | .............. H04N 7/26 |
| WO | WO 2007/002437 A2 | 1/2007 | |
| WO | WO 2008123917 A2 * | 10/2008 | |
| WO | WO 2009/041215 A1 | 4/2009 | |
| WO | WO 2010/131537 A1 | 11/2010 | .............. H04N 7/32 |

OTHER PUBLICATIONS

Japanese Office Action with English translation, dated Jan. 6, 2015, pp. 1-6, issued in Japanese Patent Application No. P2011-513289, Japanese Patent Office, Tokyo, Japan.

Extended European Search Report, issued Dec. 5, 2014, pp. 1-11, in European Patent Application No. 10774795.8, European Patent Office, Munich, Germany.

Chinese Office Action with English machine translation, Chinese Patent Application U.S. Appl. No. 201080016372.3, dated Nov. 8, 2013, pp. 1-29, State Intellectual Property Office of China, Beijing, China.

International Search Report with English translation, PCT Application No. PCT/JP2010/056378, dated Jul. 20, 2010, pp. 1-4, Japanese Patent Office, Tokyo, Japan.

Taiwan Office Action with English translation, dated Aug. 27, 2015, pp. 1-17, issued in Taiwan Patent Application No. 099111098, Taiwan Intellectual Property Office, Taipei City, Taiwan, R.O.C.

\* cited by examiner

*Fig.2*

| REFERENCE LIST NUMBER | FRAME BUFFER NUMBER |
|---|---|
| 0 | 2 |
| 1 | 3 |
| 2 | 0 |
| 3 | 1 |

| ACCURACY OF PIXEL INTERPOLATION | LIST NUMBER OF PIXEL INTERPOLATION ACCURACY |
|---|---|
| INTEGER PIXEL ACCURACY | 0 |
| 1/2 PIXEL ACCURACY | 1 |
| 1/4 PIXEL ACCURACY | 2 |
| 1/8 PIXEL ACCURACY | 3 |

(b)

| TYPE OF PIXEL INTERPOLATION FILTER | LIST NUMBER OF PIXEL INTERPOLATION FILTER |
|---|---|
| FIXED FILTER 1 | 0 |
| FIXED FILTER 2 | 1 |
| VARIABLE FILTER 1 | 2 |
| VARIABLE FILTER 2 | 3 |
| LATEST VARIABLE FILTER | 4 |

(c)

| ROUNDING METHOD IN PIXEL INTERPOLATION | LIST NUMBER OF ROUNDING METHOD IN PIXEL INTERPOLATION |
|---|---|
| ROUNDING AT ONLY CALCULATION END | 0 |
| ROUNDING EVERY DURING CALCULATION | 1 |

*Fig.4*

| REFERENCE LIST NUMBER | CODE OF REFERENCE LIST NUMBER |
|---|---|
| 0 | 00 |
| 1 | 01 |
| 2 | 10 |
| 3 | 11 |

| LIST NUMBER OF PIXEL INTERPOLATION ACCURACY | CODE OF PIXEL INTERPOLATION ACCURACY |
|---|---|
| 0 | 00 |
| 1 | 01 |
| 2 | 10 |
| 3 | 11 |

(b)

| LIST NUMBER OF TYPE OF PIXEL INTERPOLATION FILTER | CODE OF TYPE OF PIXEL INTERPOLATION FILTER |
|---|---|
| 0 | 000 |
| 1 | 001 |
| 2 | 010 |
| 3 | 011 |
| 4 | 100 |

(c)

| LIST NUMBER OF ROUNDING METHOD IN PIXEL INTERPOLATION | CODE OF ROUNDING METHOD IN PIXEL INTERPOLATION |
|---|---|
| 0 | 0 |
| 1 | 1 |

*Fig.6*

| REFERENCE LIST NUMBER | PIXEL INTERPOLATION ACCURACY | PIXEL INTERPOLATION FILTER | ROUNDING METHOD IN PIXEL INTERPOLATION |
|---|---|---|---|
| 2bit | 2bit | 3bit | 1bit |

*Fig.7*

| REFERENCE LIST NUMBER | PIXEL INTERPOLATION ACCURACY | PIXEL INTERPOLATION FILTER | ROUNDING METHOD IN PIXEL INTERPOLATION | FILTER COEFFICIENT OF VARIABLE LENGTH FILTER |
|---|---|---|---|---|
| 2bit | 2bit | 3bit | 1bit | Nbit |

*Fig.11*

| CODE OF REFERENCE LIST NUMBER | REFERENCE LIST NUMBER |
|---|---|
| 00 | 0 |
| 01 | 1 |
| 10 | 2 |
| 11 | 3 |

| CODE OF PIXEL INTERPOLATION ACCURACY | LIST NUMBER OF PIXEL INTERPOLATION ACCURACY |
|---|---|
| 00 | 0 |
| 01 | 1 |
| 10 | 2 |
| 11 | 3 |

(b)

| CODE OF TYPE OF PIXEL INTERPOLATION FILTER | LIST NUMBER OF TYPE OF PIXEL INTERPOLATION FILTER |
|---|---|
| 000 | 0 |
| 001 | 1 |
| 010 | 2 |
| 011 | 3 |
| 100 | 4 |

(c)

| CODE OF ROUNDING METHOD IN PIXEL INTERPOLATION | LIST NUMBER OF ROUNDING METHOD IN PIXEL INTERPOLATION |
|---|---|
| 0 | 0 |
| 1 | 1 |

Fig.13

| REFERENCE LIST NUMBER | FRAME BUFFER NUMBER |
|---|---|
| 0 | 2 |
| 1 | 3 |
| 2 | 0 |
| 3 | 1 |

| LIST NUMBER OF PIXEL INTERPOLATION ACCURACY | ACCURACY OF PIXEL INTERPOLATION |
|---|---|
| 0 | INTEGER PIXEL ACCURACY |
| 1 | 1/2 PIXEL ACCURACY |
| 2 | 1/4 PIXEL ACCURACY |
| 3 | 1/8 PIXEL ACCURACY |

(b)

| LIST NUMBER OF TYPE OF PIXEL INTERPOLATION FILTER | TYPE OF PIXEL INTERPOLATION FILTER |
|---|---|
| 0 | FIXED FILTER 1 |
| 1 | FIXED FILTER 2 |
| 2 | FIXED FILTER 1 |
| 3 | FIXED FILTER 2 |
| 4 | LATEST VARIABLE FILTER |

(c)

| LIST NUMBER OF ROUNDING METHOD IN PIXEL INTERPOLATION | ROUNDING METHOD IN PIXEL INTERPOLATION |
|---|---|
| 0 | ROUNDING AT ONLY CALCULATION END |
| 1 | ROUNDING EVERY DURING CALCULATION |

Fig.18

| EXECUTION OR INEXECUTION OF LUMINANCE COMPENSATION | LIST NUMBER OF EXECUTION OR INEXECUTION OF LUMINANCE COMPENSATION |
|---|---|
| EXECUTION OF LUMINANCE COMPENSATION | 0 |
| INEXECUTION OF LUMINANCE COMPENSATION | 1 |

*Fig.19*

| FIXED LENGTH CODE OF EXECUTION OR INEXECUTION OF LUMINANCE COMPENSATION | LIST NUMBER OF EXECUTION OR INEXECUTION OF LUMINANCE COMPENSATION |
|---|---|
| EXECUTION OF LUMINANCE COMPENSATION | 0 |
| INEXECUTION OF LUMINANCE COMPENSATION | 1 |

*Fig.20*

| REFERENCE LIST NUMBER | PIXEL INTERPOLATION ACCURACY | PIXEL INTERPOLATION FILTER | ROUNDING METHOD IN PIXEL INTERPOLATION | EXECUTION OR INEXECUTION OF LUMINANCE COMPENSATION |
|---|---|---|---|---|
| 2bit | 2bit | 3bit | 1bit | 1bit |

*Fig.21*

| FIXED LENGTH CODE OF EXECUTION OR INEXECUTION OF LUMINANCE COMPENSATION | LIST NUMBER OF EXECUTION OR INEXECUTION OF LUMINANCE COMPENSATION |
|---|---|
| 0 | 0 |
| 1 | 1 |

Fig.22

| LIST NUMBER OF EXECUTION OR INEXECUTION OF LUMINANCE COMPENSATION | EXECUTION OR INEXECUTION OF LUMINANCE COMPENSATION |
|---|---|
| 0 | EXECUTION OF LUMINANCE COMPENSATION |
| 1 | INEXECUTION OF LUMINANCE COMPENSATION |

Fig.23

| IDENTIFICATION NUMBER | INFORMATION RELATING TO PROCESSING METHOD FOR GENERATING PREDICTION SIGNAL ||||||
|---|---|---|---|---|---|
| | LIST NUMBER OF PIXEL INTERPOLATION ACCURACY | LIST NUMBER OF TYPE OF PIXEL INTERPOLATION FILTER | LIST NUMBER OF ROUNDING METHOD IN PIXEL INTERPOLATION | VARIABLE LENGTH FILTER COEFFICIENT |
| 0 | 3 | 0 | 0 | — |
| 1 | 3 | 1 | 0 | — |
| 2 | 2 | 2 | 1 | (2,5,8,1)/16 |
| 3 | 2 | 1 | 0 | — |
| ... | ... | ... | ... | ... |

*Fig.25*

| REFERENCE LIST NUMBER | IDENTIFICATION NUMBER | PIXEL INTERPOLATION ACCURACY | PIXEL INTERPOLATION FILTER | ROUNDING METHOD IN PIXEL INTERPOLATION |
|---|---|---|---|---|
| 2bit | Mbit | 2bit | 3bit | 1bit |

*Fig.27*

| REFERENCE LIST NUMBER | EXECUTION OR INEXECUTION OF OVERWRITING | IDENTIFICATION NUMBER | PIXEL INTERPOLATION ACCURACY | PIXEL INTERPOLATION FILTER | ROUNDING METHOD IN PIXEL INTERPOLATION |
|---|---|---|---|---|---|
| 2bit | 1bit | Mbit | 2bit | 3bit | 1bit |

*Fig.28*

| REFERENCE LIST NUMBER | EXECUTION OR INEXECUTION OF RESET | IDENTIFICATION NUMBER | PIXEL INTERPOLATION ACCURACY | PIXEL INTERPOLATION FILTER | ROUNDING METHOD IN PIXEL INTERPOLATION |
|---|---|---|---|---|---|
| 2bit | 1bit | Mbit | 2bit | 3bit | 1bit |

Fig.30

| Identification Number | Information relating to processing method for generating prediction signal | | | | | |
|---|---|---|---|---|---|---|
| | Reference list number | List number of pixel interpolation accuracy | Group of information of processing method for generating prediction signal | | | |
| | | | List number of type of pixel interpolation filter | List number of rounding method in pixel interpolation | Variable length filter coefficient | |
| 0 | 0 | 3 | 0 | 0 | — | |
| | 1 | 3 | 0 | 0 | — | |
| | 2 | 3 | 1 | 1 | — | |
| | 3 | 3 | 1 | 0 | — | |
| 1 | 0 | 3 | 0 | 0 | — | |
| | 1 | 3 | 1 | 1 | — | |
| | 2 | 2 | 2 | 0 | (2,5,8,1)/16 | |
| | 3 | 2 | 1 | 0 | — | |
| 2 | 0 | 3 | 0 | 0 | — | |
| | 0 | 2 | 0 | 0 | — | |
| | 1 | 3 | 1 | 0 | — | |
| | 1 | 2 | … | … | — | |
| … | … | … | … | … | … | |

Mbit

Fig.44

| LIST NUMBER OF TYPE OF PIXEL INTERPOLATION FILTER | TYPE OF PIXEL INTERPOLATION FILTER |
|---|---|
| 0 | H.264 INTERPOLATION FILTER (S_FIF) |
| 1 | SAIF_HALF INTERPOLATION FILTER |
| 2 | Reserved |
| 3 | Reserved |

Fig.45

| IDENTIFICATION NUMBER | INFORMATION RELATING TO COMBINATION OF PROCESSING FOR GENERATING PREDICTION SIGNAL ||||
| --- | --- | --- | --- | --- |
| | LIST NUMBER OF PIXEL INTERPOLATION ACCURACY | LIST NUMBER OF TYPE OF PIXEL INTERPOLATION FILTER | LIST NUMBER OF EXECUTION OR INEXECUTION OF LUMINANCE COMPENSATION | LIST NUMBER OF ROUNDING METHOD IN PIXEL INTERPOLATION |
| 0 | 2 | 0 | 0 | 0 |
| 1 | 2 | 1 | 0 | 0 |
| 2 | 2 | 2 | | 0 |
| 3 | 2 | 3 | | 0 |
| 4 | 2 | 4 | | 0 |
| 5 | 3 | 0 | | 0 |
| 6 | 3 | 1 | | 0 |
| 7 | 3 | 2 | | 0 |
| 8 | 3 | 3 | 0 | 0 |
| 9 | 3 | 4 | 0 | 0 |

MOVING IMAGE ENCODING AND DECODING DEVICE

This application is a continuation of PCT/JP2010/056378, filed Apr. 8, 2010, which claims the benefit of the filing date pursuant to 35 U.S.C. §119(e) of JP2009-114646, filed May 11, 2009, both of which are incorporated herein by reference.

TECHNICAL FIELD

The present invention relates to a moving image encoding/decoding system that includes a moving image encoding device, a moving image encoding method, and a moving image encoding program, the system may also include a moving image decoding device, a moving image decoding method, and a moving image decoding program.

BACKGROUND ART

A compression encoding technology is used to efficiently transmit and store moving picture data. The MPEG-1 to 4 and ITU (International Telecommunication Union) H.261 to H.264 systems are widely used for moving pictures. In moving picture encoding, a prediction signal of a target picture that is an encoding target is generated by using temporally adjacent pictures and then a residual between the target picture and the prediction signal is encoded, thereby realizing a data amount reduction. This technique is called inter-frame prediction encoding.

For example, in H.264, one frame picture is divided into a plurality of regions of blocks each composed of 16×16 pixels, and encoding processing is performed on the picture on a block-by-block basis. In inter-frame prediction encoding, a prediction signal is generated by performing motion prediction on a certain target block of a target picture using a plurality of other frame pictures that have been encoded and reconstructed (hereinafter, referred to as "reconstructed pictures") as reference pictures. At this time, the prediction signal is generated by performing block matching on prediction signal candidates with ¼ pixel accuracy generated by performing similar fixed pixel interpolation filtering on a plurality of reference pictures, and selecting a prediction signal candidate having a lowest sum of a code amount when an error with respect to a target block is encoded, and a code amount when an identifier of a reference picture and a displacement (motion vector) from the target block are encoded. Then, discrete-cosine-transformation and quantization processing are performed on a residual signal between the target block and the generated prediction signal, whereby encoded data is generated.

SUMMARY OF INVENTION

When a plurality of reference pictures that are reconstructed pictures are provided, similar processing may be performed on all of the reference pictures so as to generate prediction signal candidates. Specifically, similar fixed pixel interpolation filtering may be performed on a plurality of reference pictures that are reconstructed pictures so as to generate prediction signal candidates. Accordingly, it is difficult to perform processing most suitable for every reference picture, and it is difficult to generate a prediction signal for inter-frame prediction encoding according to an encoding target picture.

The moving image encoding and decoding system performs encoding or decoding with high efficiency by providing a preferred prediction signal suitable for a target block of a target frame picture.

In an embodiment of the moving image encoding and decoding system, a moving picture encoding device may be a moving picture encoding device that divides an encoding target picture into a plurality of target blocks, generates a prediction signal with reference to one reference picture of a plurality of reference pictures, and performs prediction encoding for every target block. The moving picture encoding device includes: a prediction signal generation method controller that determines a processing method to be performed on the reference picture for generating the prediction signal on each of the plurality of reference pictures, the processing method determined by combining a predetermined plurality of processes, and the prediction signal generation method controller determines a motion vector and a reference picture on each target block by performing motion prediction for every target block; a prediction signal generator that generates the prediction signal for the target block by performing processing on the reference picture based on the processing method determined by the prediction signal generation method controller, the processing method to be performed on the reference picture for the target block; and an encoder that encodes information on the processing method on each reference picture determined by the prediction signal generation method controller together with a reference list number identifying a reference picture and motion vector information of every target block.

The moving picture encoding device can perform encoding with high efficiency by providing a preferred reference picture suitable for a target block. Encoding can be performed with high efficiency because the moving picture encoding device determines a processing method to be performed on a reference picture for generating a prediction signal by combining a predetermined plurality of processes for each of a plurality of reference pictures, and by performing processing on a reference picture based on the determined processing method to be performed on the reference picture for the target block, the moving picture encoding device generates a prediction signal for the target block.

In this configuration, the prediction signal generation method controller may be configured to determine a specific processing method as the processing method to be performed on the reference picture in such a manner that an error between a prediction signal obtained when processing is performed on the reference picture based on the specific processing method and the corresponding target block becomes minimum. Accordingly, it makes possible to provide a preferred prediction signal suitable for a target block, and to perform encoding with high efficiency.

The prediction signal generation method controller may be configured to perform motion prediction for every target block, and determine a motion vector and a reference picture having a minimum prediction error as the motion vector and the reference picture of the corresponding specific target block.

The encoder may be configured to store the information on the processing method on each reference picture determined by the prediction signal generation method controller so as to be associated with the reference list number.

The moving picture encoding device can be embodied as a moving picture encoding method and a moving picture encoding program. The moving picture encoding method and the moving picture encoding program is further described below. The moving picture encoding method and the moving picture encoding program exhibit similar operations and effects as those described with reference to the moving picture encoding device.

A moving picture encoding method according to one embodiment is a moving picture encoding method performed by a moving picture encoding device that divides an encoding target picture into a plurality of target blocks, generates a prediction signal with reference to one reference picture of a plurality of reference pictures, and performs prediction encoding for every target block. The moving picture encoding method includes: a prediction signal generation method control step of determining a processing method to be performed on the reference picture for generating the prediction signal on each of the plurality of reference pictures by combining a predetermined plurality of processes, and determining a motion vector and a reference picture on each target block by performing motion prediction for every target block; a prediction signal generation step of generating the prediction signal for the target block by performing processing on the reference picture, based on the processing method to be performed on the reference picture for the target block, the processing method determined in the prediction signal generation method control step; and an encoding step of encoding information on the processing method on each reference picture determined in the prediction signal generation method control step together with a reference list number identifying a reference picture and motion vector information of every target block.

A moving picture encoding program according to one embodiment is a moving picture encoding program for dividing an encoding target picture into a plurality of target blocks, generating a prediction signal with reference to one reference picture of a plurality of reference pictures, and performing prediction encoding for every target block. The moving picture encoding program causes a computer to operate as: a prediction signal generation method controller that determines a processing method to be performed on the reference picture for generating the prediction signal on each of the plurality of reference pictures by combining a predetermined plurality of processes, and determines a motion vector and a reference picture on each target block by performing motion prediction for every target block; a prediction signal generator that generates the prediction signal for the target block by performing processing on the reference picture, based on the processing method to be performed on the reference picture for the target block, the processing method determined by the prediction signal generation method controller; and an encoder that encodes information on the processing method on each reference picture determined by the prediction signal generation method controller together with a reference list number identifying a reference picture and motion vector information of every target block.

In order to achieve the above-described aim, in one embodiment a moving picture decoding device generates a prediction signal with reference to one reference picture of a plurality of reference pictures and performs prediction decoding for every target block of a plurality of target blocks obtained by dividing a decoding target picture. The moving picture decoding device includes: a decoder that decodes, from input encoded data, information on a processing method to be performed on each reference picture for generating the prediction signal, and a reference list number identifying a reference picture and motion vector information of every target block; a prediction signal generation method controller that acquires, based on a reference list number of a decoding target block obtained by the decoder, information on a processing method to be performed on a reference picture corresponding to the reference list number; and a prediction signal generator that generates the prediction signal for the target block by performing processing on the reference picture based on the processing method to be performed on the reference picture for the decoding target block, the processing method acquired by the prediction signal generation method controller.

The moving picture decoding device decodes, from input encoded data, motion vector information of every target block, information on a processing method to be performed on each reference picture for generating a prediction signal, and a reference list number identifying a reference picture. The moving picture decoding device acquires information on a processing method to be performed on a reference picture corresponding to a reference list number based on the reference list number of a decoding target block, and generates a prediction signal of a target block by performing processing on the reference picture based on a processing method to be performed on the reference picture of the decoding target block. The moving picture decoding device can perform decoding with high efficiency by providing a preferred reference picture suitable for a target block.

In this configuration, the prediction signal generation method controller may be configured to acquire information on a specific processing method as the information on a processing method to be performed on the reference picture. The information may be acquired on the specific processing method in such a manner that an error between a prediction signal obtained when processing is performed on the reference picture based on the specific processing method and the corresponding target block becomes minimum. Accordingly, providing a preferred prediction signal suitable for a target block makes it possible to perform decoding with high efficiency.

The decoder may be configured to acquire by decoding and store the information on the processing method on each reference picture so that the information on the processing method is stored in association with a corresponding reference list number of a corresponding one of the reference pictures. The moving picture decoding device can be embodied as a moving picture decoding method and a moving picture decoding program. The moving picture decoding method and a moving picture decoding program is described below. The moving picture decoding method and the moving picture decoding program exhibit similar operations and effects as the moving picture decoding device.

A moving picture decoding method according to one embodiment is a moving picture decoding method performed by a moving picture decoding device that generates a prediction signal with reference to one reference picture of a plurality of reference pictures and performs prediction decoding for every target block of a plurality of target blocks obtained by dividing a decoding target picture. The moving picture decoding method includes: a decoding step of decoding, from input encoded data, information on a processing method to be performed on each reference picture for generating the prediction signal, a reference list number identifying a reference picture, and motion vector information of each target block; a prediction signal generation method control step of acquiring, based on a reference list number of a decoding target block obtained in the decoding step, information on a processing method to be performed on a reference picture corresponding to the reference list number; and a prediction signal generation step of generating the prediction signal for the target block by performing processing on the reference picture based on the processing method to be performed on the reference picture for the decoding target block acquired in the prediction signal generation method control step.

A moving picture decoding program is for generating a prediction signal with reference to one reference picture of a plurality of reference pictures and performing prediction decoding for every target block of a plurality of target blocks obtained by dividing a decoding target picture. The moving picture decoding program causes a computer to operate as: a decoder that decodes, from input encoded data, information on a processing method to be performed on each reference picture for generating the prediction signal, a reference list number identifying a reference picture, and motion vector information of every target block; a prediction signal generation method controller that acquires, based on a reference list number of a decoding target block obtained by the decoder, information on a processing method to be performed on the reference picture corresponding to the reference list number; and a prediction signal generator that generates the prediction signal for the target block by performing processing on the reference picture, based on the processing method to be performed on the reference picture for the decoding target block, the processing method acquired by the prediction signal generation method controller.

The moving image encoding/decoding system can apply to a moving picture encoding device, a moving picture encoding method, and/or a moving picture encoding program for generating a prediction signal with reference to a plurality of groups of reference pictures, not a single reference picture, and performing prediction encoding. The moving picture encoding method and the moving picture encoding program are further described below.

A moving picture encoding device according to one embodiment divides an encoding target picture into a plurality of target blocks, generates a prediction signal with reference to one set of a group of reference pictures among a plurality of sets of groups of reference pictures, and performs prediction encoding for every target block. The moving picture encoding device includes: a prediction signal generation method controller that determines a processing method to be performed on each reference picture of the group of reference pictures, each respective processing method for generating the prediction signal on each respective reference picture of the plurality of sets of groups of reference pictures by combining a predetermined plurality of processes, and the prediction signal generation method controller determines a motion vector and a group of reference pictures on each target block by performing motion prediction for every target block; a prediction signal generator that generates the prediction signal for the target block by performing processing on each reference picture of a group of reference pictures based on the processing method to be performed on each reference picture of the group of reference pictures for the target block determined by the prediction signal generation method controller; and an encoder that encodes a group of information on the processing method on the group of reference pictures of each set determined by the prediction signal generation method controller together with a group of reference list numbers identifying a group of reference pictures and motion vector information of every target block.

A moving picture encoding method according to one embodiment is a moving picture encoding method performed by a moving picture encoding device that divides an encoding target picture into a plurality of target blocks, generates a prediction signal with reference to one set of a group of reference pictures among a plurality of sets of groups of reference pictures, and performs prediction encoding for every target block. The moving picture encoding method includes: a prediction signal generation method control step of determining a processing method to be performed on each reference picture of the group of reference pictures for generating the prediction signal on each reference picture of the plurality of sets of groups of reference pictures by combining a predetermined plurality of processes, and determining a motion vector and a group of reference pictures for the target blocks by performing motion prediction for every target block; a prediction signal generation step of generating the prediction signal for the target block by performing processing on each reference picture of a group of reference pictures, based on the processing method to be performed on each reference picture of the group of reference pictures for the respective target block, the processing method determined in the prediction signal generation method control step; and an encoding step of encoding a group of information on the processing method on the group of reference pictures of each set determined in the prediction signal generation method control step together with a group of reference list numbers identifying a group of reference pictures and motion vector information of every target block.

A moving picture encoding program according to one embodiment is a moving picture encoding program for dividing an encoding target picture into a plurality of target blocks, generating a prediction signal with reference to one set of a group of reference pictures among a plurality of sets of groups of reference pictures and performing prediction encoding for every target block. The moving picture encoding program causes a computer to operate as: a prediction signal generation method controller that determines a processing method to be performed on each reference picture of the group of reference pictures for generating the prediction signal on each reference picture of the plurality of sets of groups of reference pictures by combining a predetermined plurality of processes, and determines a motion vector and a group of reference pictures on each target block by performing motion prediction for every target block; a prediction signal generator that generates the prediction signal for the target block by performing processing on each reference picture of a group of reference pictures, based on the processing method to be performed on each reference picture of the group of reference pictures for the target block, the processing method determined by the prediction signal generation method controller; and an encoder that encodes a group of information on the processing method on the group of reference pictures of each set determined by the prediction signal generation method controller together with a group of reference list numbers identifying a group of reference pictures and motion vector information of every target block.

The moving image encoding/decoding system can include a moving picture decoding device, a moving picture decoding method, and a moving picture decoding program for generating a prediction signal with reference to a plurality of groups of reference pictures, not a single reference picture, and performing prediction decoding. They are described below.

A moving picture decoding device according to one embodiment is a moving picture decoding device that generates a prediction signal with reference to one set of a group of reference pictures among a plurality of sets of groups of reference pictures and performs prediction decoding for every target block of a plurality of target blocks obtained by dividing a decoding target picture. The moving picture decoding device includes: a decoder that decodes, from input encoded data, a group of information on a processing method to be performed on each reference picture of a group of reference pictures of each set to generate the prediction signal, and a group of reference list numbers identifying group reference pictures and motion vector information of every target block; a prediction signal generation method controller that acquires a group of information on a processing method to be performed on a reference picture of a group of reference pictures corresponding to a group of reference list numbers, based on the group of reference list numbers of a decoding target block obtained by the decoder; and a prediction signal generator that generates the prediction signal for a target block by performing processing on each reference picture of a group of reference pictures, based on the processing method to be performed on each reference picture of the group of reference pictures for the decoding target block, the processing method acquired by the prediction signal generation method controller.

A moving picture decoding method according to one embodiment is a moving picture decoding method performed by a moving picture decoding device that generates a prediction signal with reference to one set of a group of reference pictures among a plurality of sets of groups of reference pictures and performs prediction decoding for every target block of a plurality of target blocks obtained by dividing a decoding target picture. The moving picture decoding method includes: a decoding step of decoding, from input encoded data, a group of information on a processing method to be performed on each reference picture of a group of reference pictures of each set to generate the prediction signal, and a group of reference list numbers identifying a group of reference pictures and motion vector information of every target block; a prediction signal generation method control step of acquiring the group of reference list numbers of a decoding target block obtained in the decoding step, a group of information on a processing method to be performed on a reference picture of a group of reference pictures corresponding to a group of reference list numbers; and a prediction signal generation step of generating the prediction signal for the respective target block by processing of a group of reference pictures, using the determined processing method to be performed on the reference picture of the group of reference pictures for the decoding target block acquired in the prediction signal generation method control step.

A moving picture decoding program according to one embodiment is a moving picture decoding program for generating a prediction signal with reference to one set of a group of reference pictures among a plurality of sets of groups of reference pictures and performing prediction decoding for every target block of a plurality of target blocks obtained by dividing a decoding target picture. The moving picture decoding program causes a computer to operate as: a decoder that decodes, from input encoded data, a group of information on a processing method to be performed on each reference picture of a group of reference pictures of each set for generating the prediction signal, and a group of reference list numbers identifying a group of reference pictures and motion vector information of every target block; a prediction signal generation method controller that acquires a group of information on a processing method to be performed on a reference picture of the group of reference pictures corresponding to the group of reference list numbers, based on the group of reference list numbers of a decoding target block obtained by the decoder; and a prediction signal generator that generates the prediction signal for the target block by performing processing on each reference picture of the group of reference pictures, based on the processing method to be performed on each reference picture of the group of reference pictures for the decoding target block acquired by the prediction signal generation method controller.

The moving picture encoding device can perform encoding with high efficiency by providing a preferred reference picture suitable for a target block because the moving picture encoding device determines a processing method to be performed on a reference picture for generating a prediction signal by combining a predetermined plurality of processes for each of a plurality of reference pictures, and generates a prediction signal for a target block by performing processing on a reference picture based on the determined processing method to be performed on the reference picture for the target block.

The moving picture decoding device can perform decoding with high efficiency by providing a preferred reference picture suitable for a target block because the moving picture decoding device decodes, from input encoded data, information on a processing method to be performed on each reference picture for generating a prediction signal, and a reference list number identifying a reference picture and motion vector information of every target block, the moving picture decoding device also acquires information on a processing method to be performed on a reference picture corresponding to a reference list number based on the reference list number of a decoding target block, and generates a prediction signal of a target block by performing processing on the reference picture based on a processing method to be performed on a reference picture of the decoding target block.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

FIG. 2 is a schematic illustrating an example reference list.

FIG. 3 is a schematic illustrating example lists of processing methods for generating a prediction signal.

FIG. 4 is schematic illustrating an example table of reference list numbers and their codes.

FIG. 5 is a schematic illustrating example tables of processing methods for generating a prediction signal, and their codes.

FIG. 6 is a schematic of an example of encoded data of a certain reference picture when a list number of a type of pixel interpolation filter is other than 2 or 3.

FIG. 7 is a schematic of an example of encoded data of a certain reference picture when a list number of a type of pixel interpolation filter is 2 or 3.

FIG. 11 is a schematic illustrating an example of a table of codes of reference list numbers and their reference list numbers.

FIG. 12 is a schematic illustrating example tables of codes of processing methods for generating a prediction signal and their list numbers of the processing methods.

FIG. 13 is a schematic illustrating an example reference list.

FIG. 14 is a schematic illustrating an example of lists of processing methods for generating a prediction signal.

FIG. 18 is an example table of a list illustrating execution or non-execution of luminance compensation prediction processing.

FIG. 19 is an example table of execution or non-execution of luminance compensation prediction processing, and their codes.

FIG. 20 is a schematic of an example of prediction signal generation method encoded data.

FIG. 21 is an example table of execution or non-execution of luminance compensation prediction processing, and their codes.

FIG. 22 is an example table of a list illustrating execution or non-execution of luminance compensation prediction processing.

FIG. 23 is an example table illustrating information on processing for generating a prediction signal and their identification numbers.

FIG. 25 is a schematic of an example of prediction signal generation method encoded data.

FIG. 27 is a schematic of an example of prediction signal generation method encoded data.

FIG. 28 is a schematic of an example of prediction signal generation method encoded data.

FIG. 30 is a schematic illustrating an example of groups of information on processing for generating a prediction signal, and their identification numbers.

FIG. 44 is a table illustrating another example of FIG. 14(b).

FIG. 45 is a table illustrating another example of FIG. 23.

DESCRIPTION OF EMBODIMENTS

Example embodiments are described below with reference to the accompanying drawings. In each drawing, same or equivalent parts are appended with the same numerals.

Moving Picture Encoding Device

Figure 1:
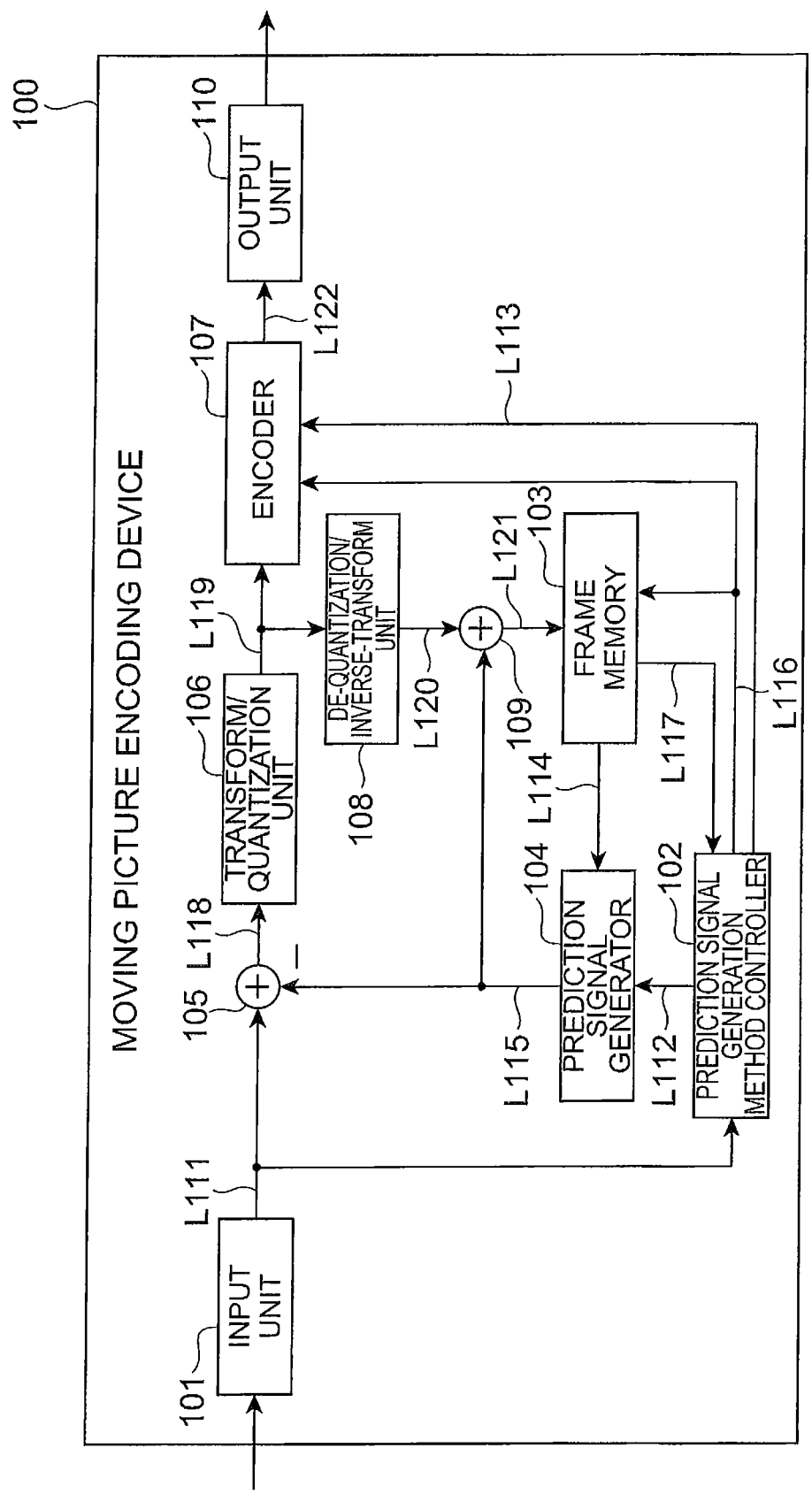
FIG. 1 is a block diagram of a moving picture encoding device according to an example embodiment.

FIG. 1 illustrates a block diagram of a moving image encoding device 100 of an example embodiment of the moving image encoding/decoding system. The moving image encoding device 100 may be a computing device or computer, including for example software, hardware, or a combination of hardware and software, as described later, capable of performing the described functionality. The moving image encoding apparatus 100 may be one or more separate systems or devices included in the moving image encoding/decoding system, or may be combined with other systems or devices within the moving image encoding/decoding system. In other examples, fewer or additional blocks may be used to illustrate the functionality of the moving image encoding device 100. The moving picture encoding device 100 includes an input unit 101, a prediction signal generation method controller 102 (or prediction signal generation method controller unit), a frame memory 103, a prediction signal generator 104 (or prediction signal generator unit), a subtractor 105 (or subtractor unit), a transform/quantization unit 106, an encoder 107 (or encoder unit), a de-quantization/inverse-transform unit 108, an adder 109 (or adder unit), and an output unit 110. As for the moving picture encoding device 100 thus structured, a function of each unit is described below. The term "unit" is defined to include one or more executable parts of a moving image encoding device or moving image decoding device. As described herein, the units are defined to include software, hardware, or some combination thereof executable by a processor (described later). Software included in the units may include instructions stored in memory, or any other computer readable storage medium, that are executable by the processor, or any other processor. Hardware included in the units may include various devices, components, circuits, gates, circuit boards, and the like that are executable, directed, and/or controlled for performance by the processor.

The input unit 101 receives a plurality of pictures constituting a moving picture. Then, the input unit 101 divides a picture that is a target of encoding into a plurality of target blocks each composed of 8×8 pixels. Then, the input unit 101 outputs a target block that is a processing target to the prediction signal generation method controller 102 and the subtractor 105 through a line L111. The size of the target block is not limited to 8×8 pixels.

The prediction signal generation method controller 102 determines a processing method for prediction signal generation for every reference picture by combining a plurality of previously stored predetermined processes. During operation, the prediction signal generation method controller 102 determines a processing method for prediction signal generation for every reference picture by combining a plurality of the previously stored predetermined processes in such a manner that a residual signal becomes minimum when motion prediction is performed on an encoding target block input through the input unit 101 through the line L111 by using a reference picture in the frame memory 103 input through a line L117. The method in which the prediction signal generation method controller 102 determines a processing method for prediction signal generation by combining a plurality of processes is not limited to the above. The prediction signal generation method controller 102 outputs to the prediction signal generator 104 through a line L112, for every frame picture being encoded, information on a processing method performed on each reference picture. In addition, the prediction signal generation method controller 102 outputs to the encoder 107 through a line L113, for every frame picture being encoded, information on processing to be performed on each reference picture. Then, the prediction signal generation method controller 102 perform's motion prediction for every encoding target block, and outputs information on a motion vector having the minimum prediction error and a reference picture, to the frame memory 103 and the encoder 107 through a line L116. The method in which the prediction signal generation method controller 102 performs motion prediction and determines information on a motion vector and a reference picture is not limited to the above.

The frame memory 103 stores a plurality of reference pictures that were already encoded in the past and then reconstructed. The frame memory 103 outputs a reference picture to the prediction signal generation method controller 102 through the line L117 in order that the prediction signal generation method controller 102 determines a processing method for prediction signal generation performed on each reference picture. In addition, the frame memory 103 outputs a reference picture to the prediction signal generation method controller 102 through the line L117 in order to perform motion prediction of an encoding target block. Furthermore, the frame memory 103 reads out a pixel signal of a reference picture stored in the frame memory 103 that is used for generating a prediction signal from the reference picture by using information on a motion vector and the reference picture received from the prediction signal generation method controller 102, and outputs the pixel signal to the prediction signal generator 104 through a line L114.

The prediction signal generator 104 generates a prediction signal for a target block with respect to a pixel signal of a reference picture received from the frame memory 103, based on the information on a processing method for prediction signal generation received from the prediction signal generation method controller 102. The prediction signal generator 104 outputs the generated prediction signal to the subtractor 105 and the adder 109 through a line L115.

The subtractor 105 obtains a residual between a target block input through the input unit 101 and a prediction signal received from the prediction signal generator 104, and outputs the residual to the transform/quantization unit 106 through a line L118.

The transform/quantization unit 106 performs transformation on a residual signal received from the subtractor 105 and thereafter performs quantization, and outputs the quantized signal to the encoder 107 and the de-quantization/inverse-transform unit 108 through a line L119.

The encoder 107 encodes information on processing performed on each reference picture received from the prediction signal generation method controller 102 (i.e., produces prediction signal generation method encoded data) before encoding the first target block of an encoding target frame picture. In addition, the encoder 107 encodes, for every target block of an encoding target frame picture, information on a reference list number and a motion vector received from the prediction signal generation method controller 102, and quantized transform coefficients of residual signal received from the transform/quantization unit 106. Then, the encoder 107 outputs encoded data to the output unit 110 through a line L122.

The de-quantization/inverse-transform unit 108 performs de-quantization and inverse-transformation on quantized transform coefficients of residual signal received from the transform/quantization unit 106 so as to produce a residual signal, and outputs the residual signal to the adder 109 through a line L120.

The adder 109 adds a prediction signal received from the prediction signal generator 104 and a residual signal received from the de-quantization/inverse-transform unit 108 so as to reconstruct a target block, and outputs the reconstructed target block to the frame memory 103 as a reference picture through a line L121.

The output unit 110 outputs the encoded data received from the encoder 107 to outside the moving picture encoding device 100.

Next, the frame memory 103 is described in detail. The frame memory 103 is composed of a plurality of frame buffers, and stores in each frame buffer a reference picture previously reconstructed. Each frame buffer is controlled by a reference list. FIG. 2 is a schematic illustrating a reference list. Specifically, the reference list represents a correspondence between a frame buffer number allocated for each frame buffer and a reference list number. The method for making a correspondence between a frame buffer number and a reference list number may be a predetermined automatic method or may be a manually determined method. The frame memory 103, by using a reference list number and a motion vector, reads out a pixel signal at an address that the motion vector indicates from a reference picture stored in a frame buffer having a frame buffer number corresponding to the reference list number in the reference list, and outputs the pixel signal to the prediction signal generator 104.

Next, the prediction signal generation method controller 102 is described in detail. The prediction signal generation method controller 102 stores information regarding a processing method for a reference picture for generating a prediction signal. Specifically, the prediction signal generation method controller 102 stores as types of the processing methods a list that includes: (a) accuracy of pixel interpolation, (b) a type of pixel interpolation filter, and (c) a calculation rounding method for pixel interpolation. Here, (a) the accuracy of pixel interpolation from a previously reconstructed reference picture indicates integer pixel accuracy, or a level of accuracy of pixel interpolation when a prediction signal with fractional pixel accuracy is produced by pixel interpolation. Additionally, (b) the type of pixel interpolation filter indicates a type of filter used for filtering a previously reconstructed reference picture to produce a prediction signal with integer pixel accuracy, or with a level of fractional pixel accuracy by pixel interpolation from the previously reconstructed reference picture=. Furthermore, (c) the calculation rounding method of pixel interpolation indicates how an integer value or a fractional value is rounded during filtering of a previously reconstructed reference picture when a prediction signal with integer pixel accuracy or with fractional pixel accuracy is produced from the previously reconstructed reference picture. FIG. 3 is a list illustrating processing methods for generating a prediction signal stored in the prediction signal generation method controller 102. FIG. 3 (a) is a list illustrating accuracy of pixel interpolation, FIG. 3 (b) is a list illustrating types of pixel interpolation filters, and FIG. 3(c) is a list illustrating rounding methods in pixel interpolation. The lists illustrate processing methods in the respective processing types. The list of accuracy of pixel interpolation of FIG. 3 (a) includes integer pixel accuracy, ½ pixel accuracy, ¼ pixel accuracy, and ⅛ pixel accuracy, and 0, 1, 2, and 3 are respectively allocated to the different accuracies as list numbers. The types of pixel interpolation filters of FIG. 3 (b) include two types of fixed filters: fixed filter 1 and fixed filter 2 having fixed filter coefficients, two types of variable filters: variable filter 1 and variable filter 2 having variable filter coefficients, and a latest variable filter that is similar to variable filter as used in a latest process performed by using the variable filter 1 or the variable filter 2. In addition, 0, 1, 2, 3, and 4 are allocated to the respective filters as list numbers. The rounding methods in pixel interpolation of FIG. 3(c) include rounding at only calculation end, and rounding during every calculation, and 0 and 1 are allocated to the respective rounding methods as list numbers. The prediction signal generation method controller 102 determines a processing method for generating a prediction signal for every reference picture by combining a plurality of the previously stored processes before performing processing on each target block of an encoding target frame picture. In a determination method herein, the processing method is determined in such a manner that when motion prediction is performed by processing a pixel signal of a reference picture for each reference picture received from the frame memory, an error with respect to an input picture becomes minimum. In addition, the prediction signal generation method controller 102 uses a reference list number as an identification number of a reference picture, determines a prediction signal generation method by combining the above-described (a) accuracy of pixel interpolation, (b) type of pixel interpolation filter, and (c) calculation rounding method in pixel interpolation for every reference list number, and outputs information of the determined prediction signal generation method to the encoder 107. Then, the prediction signal generation method controller 102 performs motion prediction for every encoding target block, and outputs information on a motion vector having the minimum prediction error and a reference picture, to the frame memory 103 through a line L116.

Next, the prediction signal generator 104 is described in detail. The prediction signal generator 104 receives a pixel signal of a reference picture for generating a prediction signal from the frame memory 103, and generates a prediction signal by performing processing on a reference picture based on a processing method corresponding to a reference list number of the reference picture received from the prediction signal generation method controller 102. Then, the prediction signal generator 104 outputs the generated prediction signal to the subtractor 105 and the adder 109.

Figure 8:
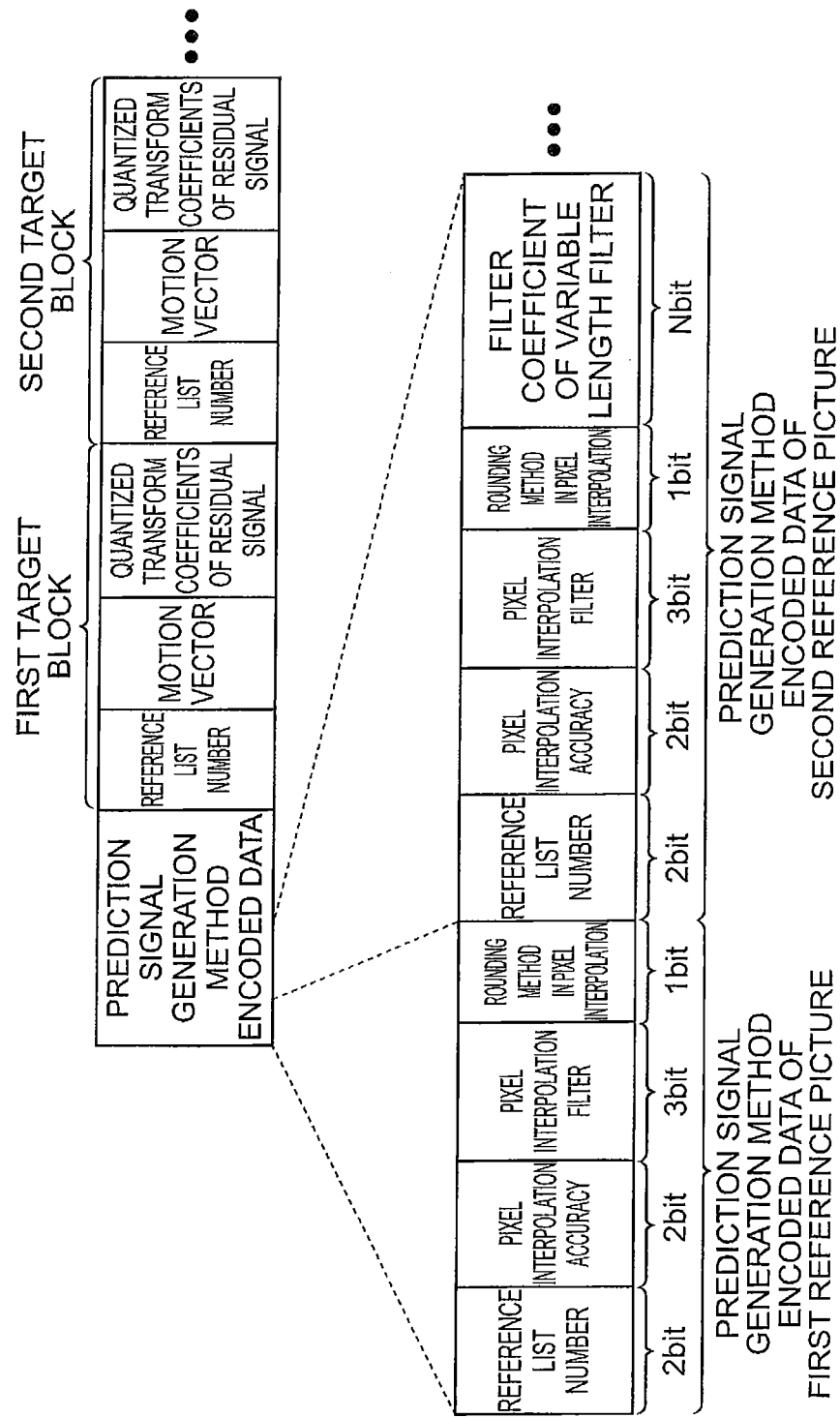
FIG. 8 is an example schematic of encoded data.

Next, the encoder 107 is described in detail. The encoder 107 first encodes, for every encoding target frame picture, a reference list number and information on a processing method for generating a corresponding prediction signal received from the prediction signal generation method controller 102, and stores the encoded reference list number and information on the processing method in the encoder 107. FIG. 4 is a table illustrating reference list numbers and their codes. FIG. 5 illustrates a table of processing methods of prediction signal generation and their codes. FIGS. 5(a), 5(b), and 5(c) are tables of the list numbers and their codes of the accuracy of pixel interpolation, the type of pixel interpolation filter, and the calculation rounding method in pixel interpolation, respectively. When the list number of the type of pixel interpolation filter is 2 or 3, i.e., the type of pixel interpolation filter is the variable length filter 1 or the variable length filter 2, the encoder 107 lastly encodes a filter coefficient of the variable length filter. FIG. 6 is a schematic of data of an encoded reference list number and information on a processing method for prediction signal generation of a certain reference picture when the list number of the type of pixel interpolation filter is other than 2 or 3. FIG. 7 is a schematic of data of an encoded reference list number and information on a processing method for prediction signal generation of a certain reference picture (prediction signal generation method encoded data) when the list number of the type of pixel interpolation filter is 2 or 3. The encoder 107 combines, for a number of times equal to a predetermined number of reference pictures, an encoded reference list number with a processing method for prediction signal generation. Thereafter, the encoder 107 encodes, for every target block of an encoding target frame picture, a reference list number and a motion vector for generating a prediction signal, and quantized transform coefficients of residual signal, and outputs the encoded reference list number, motion vector, and quantized transform coefficients of residual signal to the output unit 110 together with the above-described prediction signal generation method encoded data. FIG. 8 is a schematic of encoded data.

Moving Picture Encoding Method

Figure 9:
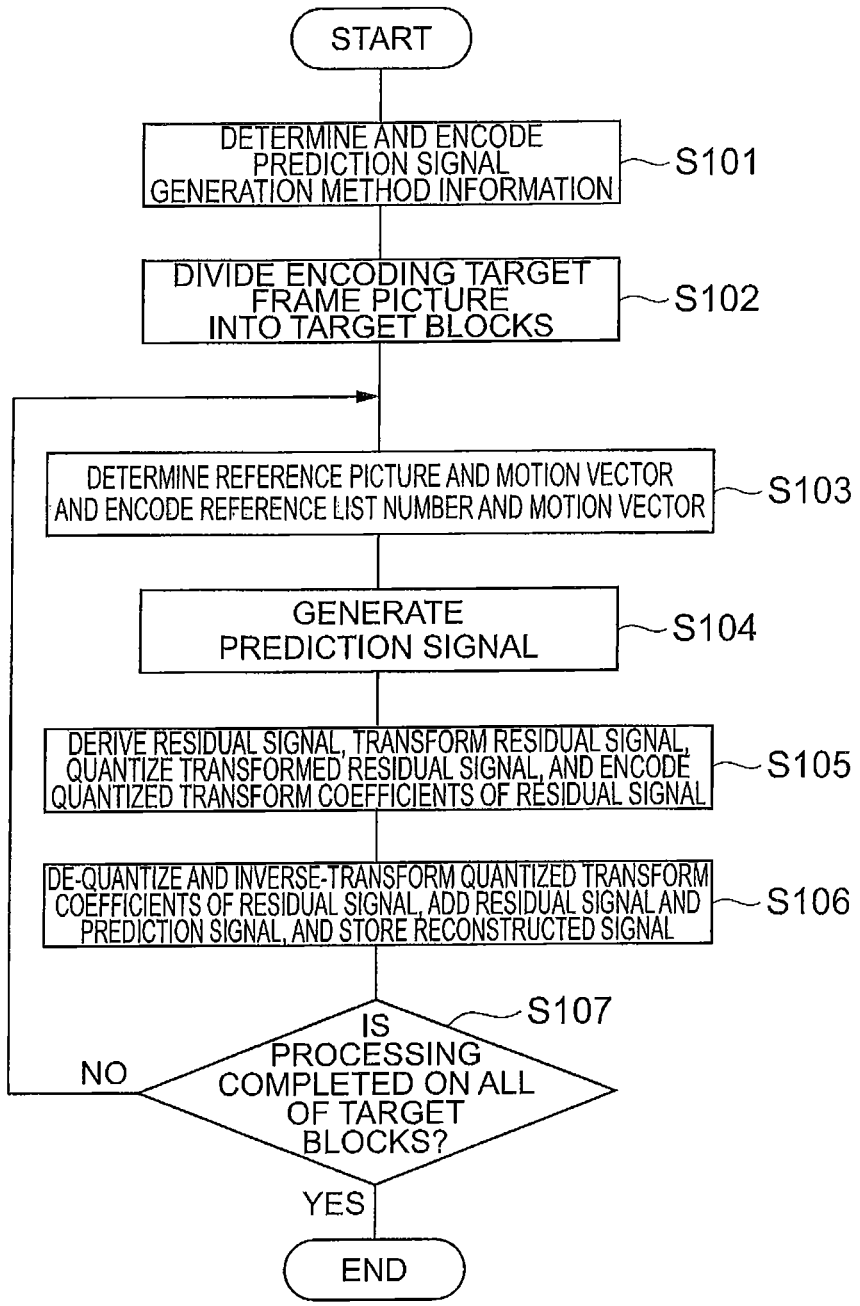
FIG. 9 is a flowchart of a moving picture encoding method according to an example embodiment.

Next, processing according to a moving picture encoding method performed by the moving picture encoding device 100 is described by using FIG. 9. FIG. 9 is a flowchart illustrating processing of a moving picture encoding method according to the present embodiment.

First, the prediction signal generation method controller 102 determines, for every encoding target frame picture, a processing method to be performed on each reference picture by using an encoding target frame picture input through the input unit 101 and a reference picture received from the frame memory 103. The encoder 107 encodes information on the determined processing method so as to produce prediction signal generation method encoded data (step S101). The information on the determined processing method for prediction signal generation is also output to the prediction signal generator 104.

Then, the input unit 101 receives a signal of a moving picture composed of a plurality of pictures, and thereafter divides an encoding target frame picture into a target block composed of 8×8 pixels (step S102).

Then, the prediction signal generation method controller 102 performs motion prediction (performs block matching) for every encoding target block, and determines a motion vector having a minimum prediction error with respect to a target block and a reference picture. The encoder 107 encodes a reference list number of the reference picture and information on the motion vector (step S103).

Then, the prediction signal generator 104 performs processing, on a pixel signal of a reference picture read out from the frame memory 103, corresponding to the reference picture, based on the information on the processing method for prediction signal generation, thereby producing a prediction signal (step S104).

Then, the subtractor 105 calculates a residual between the target block input through the input unit 101 and the prediction signal generated by the prediction signal generator 104. The transform/quantization unit 106 performs transformation of a residual signal calculated by the subtractor 105, and thereafter performs quantization, and outputs the obtained quantized transform coefficients of residual signal to the encoder 107 and the de-quantization/inverse-transform unit 108. The encoder 107 encodes the quantized transform coefficients of residual signal (step S105).

Then, the de-quantization/inverse-transform unit 108 performs de-quantization and inverse-transformation of the quantized transform coefficients of residual signal output from the transform/quantization unit 106. The adder 109 adds a signal after de-quantization and inverse-transformation (reconstructed residual signal) and the prediction signal. The reconstructed signal after adding is stored in the frame memory 103 as a reference picture (step S106).

Then the moving picture encoding device 100 determines whether or not the above-described processing from steps S103 to S106 is completed on all of the target blocks of the encoding target frame picture (step S107). If a target block remains unprocessed (NO in step S107), the moving picture encoding device 100 repeats processing from steps S103 to S106 on the unprocessed target block. In contrast, if processing is completed on all of the target blocks (YES in step S107), the moving picture encoding device 100 ends processing of FIG. 9.

Moving Picture Decoding Device

Figure 10:
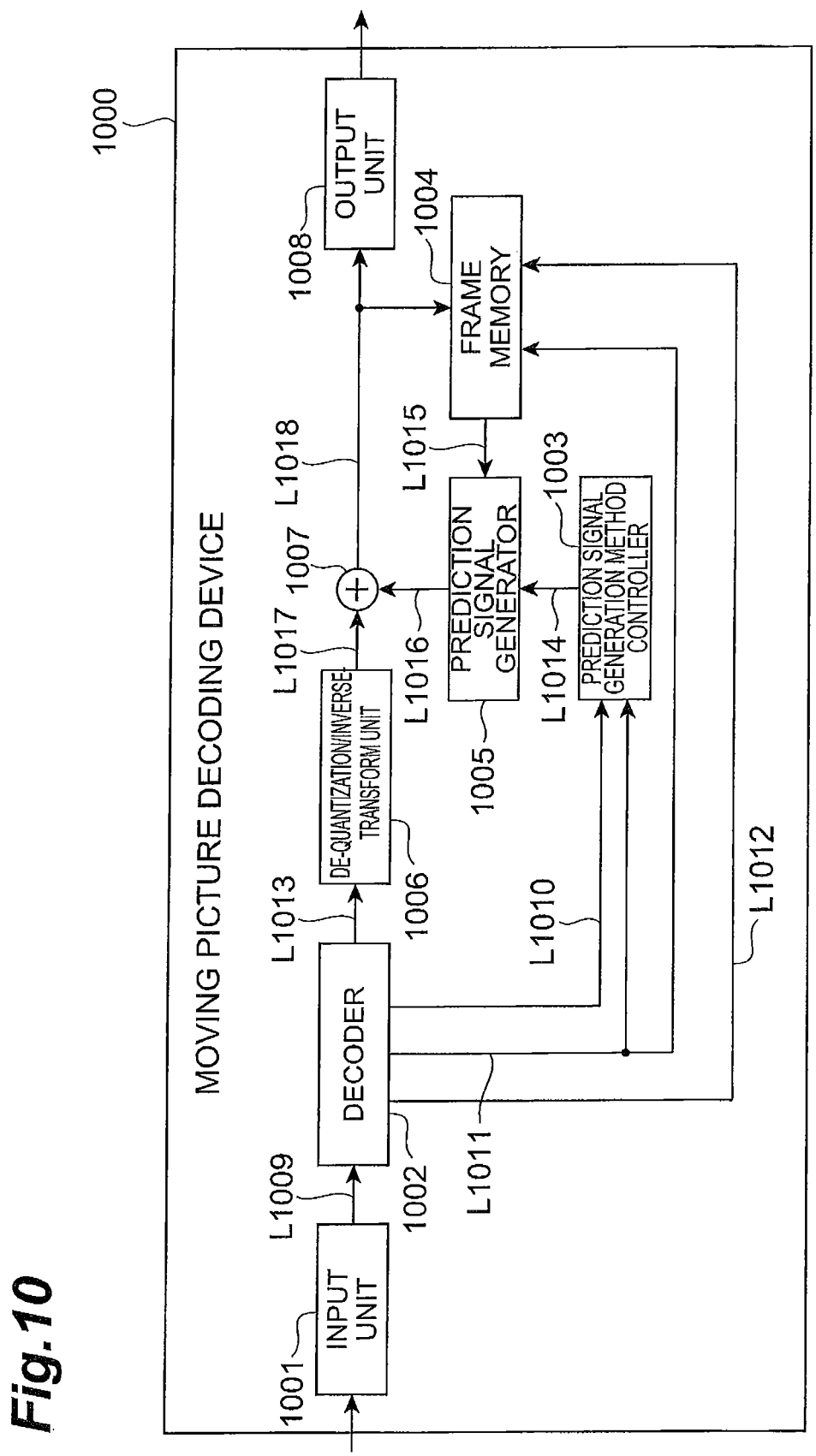
FIG. 10 is a block diagram of a moving picture decoding device according to an example embodiment.

Next, a moving picture decoding device according to the present embodiment is described. FIG. 10 is a block diagram of a moving picture decoding device 1000 according to the present embodiment. The moving image decoding device 1000 may be a computing device or computer, including for example software, hardware, or a combination of hardware and software, as described later, capable of performing the described functionality. The moving image decoding device 1000 may be one or more separate systems or devices included in the moving image encoding/decoding system, or may be combined with other systems or devices within the moving image encoding/decoding system. In other examples, fewer or additional blocks may be used to illustrate the functionality of the moving image decoding device 1000. The moving picture decoding device 1000 includes an input unit 1001, a decoder 1002 (or decoder unit), a prediction signal generation method controller 1003 (or prediction signal generation method controller unit), a frame memory 1004, a prediction signal generator 1005 (or prediction signal generator unit), a de-quantization/inverse-transform unit 1006, an adder 1007 (or adder unit), and an output unit 1008.

A function of each unit of the moving picture decoding device 1000 thus structured is described below.

The input unit 1001 receives encoded data encoded by the above-described moving picture encoding device, and outputs the encoded data to the decoder 1002.

The decoder 1002 first decodes, from encoded data input through the input unit 1001, for every decoding target frame picture, information on processing to be performed on each reference picture (prediction signal generation method encoded data) and outputs the decoded information to the prediction signal generation method controller 1003 through a line L1010. Then, the decoder 1002 decodes, for every target block of a decoding target frame picture, a reference list number of a reference picture used for generating a prediction signal and outputs the decoded reference list number to the prediction signal generation method controller 1003 and the frame memory 1004 through a line L1011. Then, the decoder 1002 decodes, for every target block of a decoding target frame picture, data of a motion vector, and outputs the decoded data to the frame memory 1004 through a line L1012. Then, the decoder 1002 decodes quantized transform coefficients of residual signal, and outputs the decoded signal representing a decoding target block to the de-quantization/inverse-transform unit 1006.

The prediction signal generation method controller 1003 stores information on a processing method for prediction signal generation for every reference picture received from the decoder 1002. The prediction signal generation method controller 1003 refers to stored information on processing on each reference picture and the reference list number of the decoding target block received from the decoder 1002, and outputs information on a processing method for prediction signal generation corresponding to the reference list number to the prediction signal generator 1005 through a line L1014.

The frame memory 1004 stores a plurality of reference pictures that are already previously decoded and reconstructed. The frame memory 1004 receives a reference list number of a reference picture and information on a motion vector used for generating a prediction signal from the decoder 1002 with respect to a target block being decoded, and outputs a pixel signal of an address of a location that the motion vector indicates in the reference picture to the prediction signal generator 1005 through a line L1015.

The prediction signal generator 1005 performs processing on the pixel signal for generating a prediction signal received from the frame memory 1004 by using the information on processing and the reference list number of the reference picture received from the prediction signal generation method controller 1003 so as to generate a prediction signal of a target block being decoded.

The de-quantization/inverse-transform unit 1006 performs de-quantization and inverse-transformation on quantized transform coefficients of residual signal received from the decoder 1002 so as to produce a residual signal, and outputs the residual signal to the adder 1007 through a line L1007.

The adder 1007 adds the prediction signal received from the prediction signal generator 1005 and the residual signal received from the de-quantization/inverse-transform unit 1006 so as to reconstruct, a target block, and outputs the reconstructed target block to the frame memory 1004 and the output unit 1008 as a reference picture through a line L1018.

The output unit 1008 outputs the reconstructed target block received from the adder 1007 to outside the moving picture decoding device 1000.

Next, the decoder 1002 is described in detail. Encoded data input to the decoder 1002 from the input unit 1001 is similar to the aforementioned encoded data illustrated in FIG. 8. The decoder 1002 sequentially decodes, from encoded data input through the input unit 1001, for every decoding target frame picture, information on a processing method for prediction signal generation relating to each reference picture (here, a list number of pixel interpolation, a list number of the type of pixel interpolation filter, and a list number of the calculation rounding method in pixel interpolation that are types of processing methods). FIG. 11 is a table illustrating codes of reference list numbers and their reference list numbers. FIG. 12 illustrates tables of codes of processing methods and their list numbers. Specifically, FIG. 12(*a*) illustrates a table of code of pixel interpolation accuracy and its list number, FIG. 12(*b*) illustrates a table of code of types of pixel interpolation filters and their list numbers, and FIG. 12(*c*) illustrates codes of calculation rounding methods in pixel interpolation and their list numbers. When the decoded list number of a type of pixel interpolation filter is 2 or 3, the decoder 1002 decodes a filter coefficient of a variable filter after a calculation rounding method in pixel interpolation is decoded. When the list number of the type of pixel interpolation filter is other than 2 or 3, encoded reference list number and information on a processing method for prediction signal generation with respect to a certain reference picture before being decoded is similar to the aforementioned information illustrated in FIG. 6. When the list number of the type of pixel interpolation filter is 2 or 3, encoded reference list number and information on a processing method for prediction signal generation with respect to a certain reference picture before being decoded is the same as the aforementioned information illustrated in FIG. 7. Then, the decoder 1002 decodes, for a number of times equal to a predetermined number of reference pictures, a reference list number and information on a processing method for prediction signal generation, and outputs the decoded numbers and information to the prediction signal generation method controller 1003. Then, the decoder 1002 decodes, for every decoding target block, a reference list number and a motion vector, and quantized transform coefficients of residual signal.

Next, the frame memory 1004 is described in detail. The frame memory 1004 is composed of a plurality of frame buffers, and stores a reference picture that was previously reconstructed in each frame buffer. Each frame buffer is controlled by a reference list. FIG. 13 is a schematic illustrating a reference list. Specifically, the reference list represents a correspondence between a frame buffer number allocated to each frame buffer and a reference list number. The method for making a correspondence between a frame buffer number and a reference list number may be an automatic method preliminarily determined or a method determined manually. The frame memory 1004 outputs a picture signal at an address that a motion vector received from the decoder 1002 indicates in a reference picture stored in a frame buffer having a frame buffer number corresponding to a reference list number of a decoding target block received from the decoder 1002 to the prediction signal generator 1005.

Next, the prediction signal generation method controller 1003 is described in detail. The prediction signal generation method controller 1003 stores a reference picture list for generating a prediction signal and information on a processing method on a reference picture of a reference list number of the reference picture list. Specifically, the prediction signal generation method controller 1003 stores lists of (a) accuracy of pixel interpolation, (b) a type of pixel interpolation filter, and (c) a calculation rounding method in pixel interpolation as the types of the processing methods. Here, (a) accuracy of pixel interpolation represents accuracy of pixel interpolation when a prediction signal with fractional pixel accuracy is produced from an already reconstructed reference picture with integer pixel accuracy by pixel interpolation. Additionally, (b) the type of pixel interpolation filter represents a type of filter used for an already reconstructed reference picture when a prediction signal with fractional pixel accuracy is produced from the already reconstructed reference picture with integer pixel accuracy by pixel interpolation. Furthermore, (c) the calculation rounding method in pixel interpolation represents that when a fractional value in the calculation is rounded to an integer value in the calculation by filtering an already reconstructed reference picture when a prediction signal with fractional pixel accuracy is produced from the already reconstructed reference picture by pixel interpolation. FIG. 14 is a list illustrating a processing method stored in the prediction signal generation method controller 1003. FIG. 14(*a*) is a list illustrating accuracy of pixel interpolation, FIG. 14(*b*) is a list illustrating types of pixel interpolation filters, and FIG. 14(*c*) is a list illustrating a rounding method in pixel interpolation. The lists illustrate processing methods in the respective processing types. The list of accuracy of pixel interpolation of FIG. 14(*a*) includes the list numbers of 0, 1, 2, and 3. The list numbers are allocated to integer pixel accuracy, ½ pixel accuracy, ¼ pixel accuracy, and ⅛ pixel accuracy, respectively. The list of types of pixel interpolation filters of FIG. 14(*b*) includes the list numbers of 0, 1, 2, 3, and 4. The list numbers are allocated to two types of fixed filter: fixed filter 1 and fixed filter 2 having fixed filter coefficients, two types of variable filter: variable filter 1 and variable filter 2 having variable filter coefficients, and a latest variable filter that is similar to variable filter as the latest processing performed by using the variable filter 1 or the variable filter 2, respectively. The list of rounding methods in pixel interpolation of FIG. 14(*c*) includes the list numbers of 0 and 1. The list numbers are allocated to rounding at only calculation end, and rounding during every calculation, respectively.

Next, the prediction signal generator 1005 is described in detail. The prediction signal generator 1005 receives a picture signal for generating a prediction signal of a decoding target block from the frame memory 1004. Then the prediction signal generator 1005 performs processing on the picture signal based on a processing method corresponding to a reference list number of the decoding target block received from the prediction signal generation method controller 1003, thereby producing a prediction signal of the decoding target block.

Moving Picture Decoding Method

Figure 15:
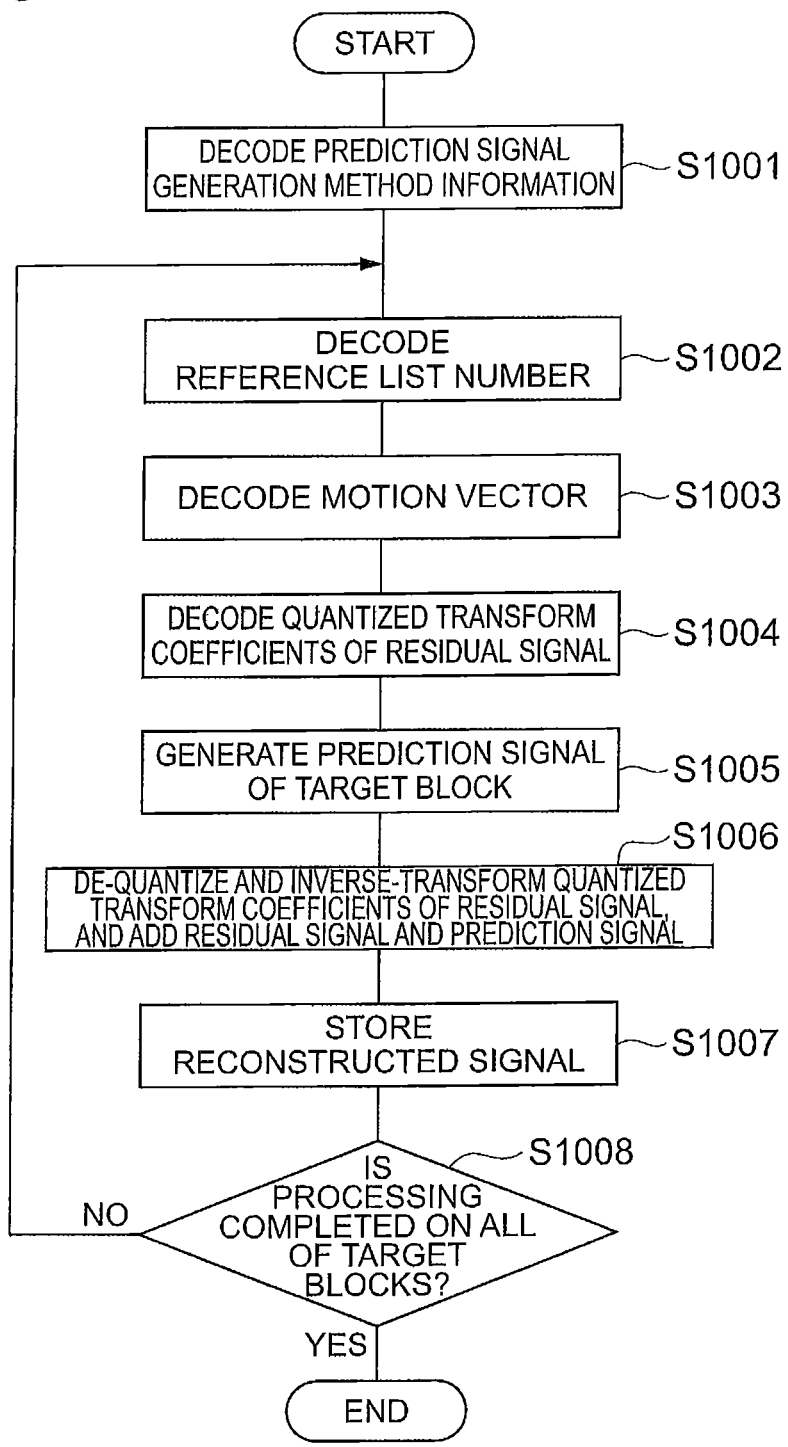
FIG. 15 is a flowchart of a moving picture decoding method according to an example embodiment.

Next, processing according to a moving picture decoding method performed by the moving picture decoding device 1000 is described by using FIG. 15. FIG. 15 is a flowchart illustrating processing of a moving picture decoding method according to the present embodiment.

First, after the input unit 1001 receives encoded data, the decoder 1002 decodes, for every decoding target frame picture, information on a processing method performed on each reference picture for generating a prediction signal (step S1001).

Then, the decoder 1002 decodes a reference list number of a reference picture of a decoding target block (step S1002).

Then, the decoder 1002 decodes a motion vector of the decoding target block (step S1003).

Then, the decoder 1002 decodes quantized transform coefficients of residual signal of the decoding target block (step S1004).

Then, the prediction signal generator 1005 reads out a reference picture for generating a prediction signal from the frame memory 1004 by using the decoded reference list number and motion vector, and performs processing on the reference picture based on information on a processing method stored in the prediction signal generation method controller 1003, thereby producing a prediction signal of the decoding target block (step S1005).

Next, the de-quantization/inverse-transform unit 1006 performs de-quantization and inverse-transformation on quantized transform coefficients of residual signal output from the decoder 1002. The adder 1007 adds a signal after the de-quantization and inverse-transformation (reconstructed residual signal) and the generated prediction signal (step S1006). As a result, a picture signal of the target block is reconstructed. The reconstructed picture signal of the target block is output by the output unit 1008, and stored in the frame memory 1004 as a reference picture (step S1007).

Then, the moving picture decoding device 1000 determines whether or not the above-described processing from steps S1002 to S1007 is completed on all of the target blocks of the decoding target frame picture (step S1008). If a target block remains unprocessed (NO in step S1008), the moving picture decoding device 1000 repeats processing from steps S1002 to S1007 on the unprocessed target block. In contrast, if processing is completed on all of the target blocks (YES in step S1008), the moving picture decoding device 1000 ends processing of FIG. 15.

Moving Picture Encoding Program and Moving Picture Decoding Program

The moving picture encoding device can be embodied as a moving picture encoding program to cause a computer to operate as a moving picture encoding device. The moving picture encoding method according to the present embodiment can also be provided by being stored in a recording medium as a program. The moving picture decoding device can be embodied as a moving picture decoding program to cause a computer to operate as a moving picture decoding device. The moving picture decoding method according to the present embodiment can be also provided by being stored in a recording medium as a program.

The moving picture encoding program and the moving picture decoding program are provided by being stored in a recording medium, for example. Examples of the recording medium include recording media including flexible disks, CD-ROMs and DVDs, recoding media such as ROMs, and semiconductor memories.

Figure 16:
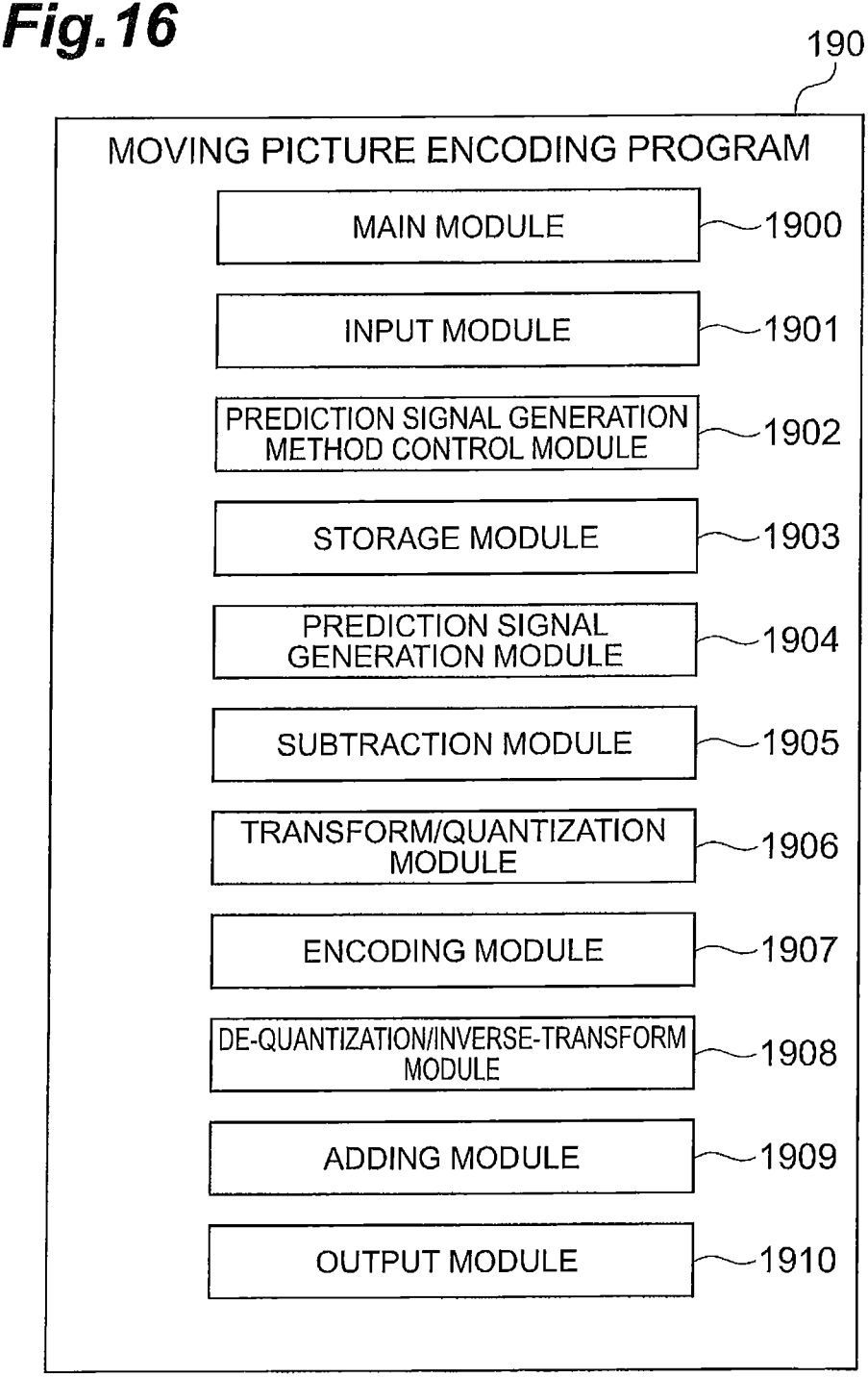
FIG. 16 is a schematic illustrating of a structure of a moving picture encoding program according to an example embodiment.

By using FIG. 16, a moving picture encoding program 190 to cause a computer to operate as the moving picture encoding device 100 is described. As illustrated in FIG. 16, the moving picture encoding program 190 includes a main module 1900 that controls processing, an input module 1901, a prediction signal generation method control module 1902, a storage module 1903, a prediction signal generation module 1904, a subtraction module 1905, a transform/quantization module 1906, an encoding module 1907, a de-quantization/inverse-transform module 1908, an adding module 1909, and an output module 1910. The respective functions that the input module 1901, the prediction signal generation method control module 1902, the storage module 1903, the prediction signal generation module 1904, the subtraction module 1905, the transform/quantization module 1906, the encoding module 1907, the de-quantization/inverse-transform module 1908, the adding module 1909, and the output module 1910 cause a computer to operate as are the same as the respective functions of the input unit 101, the prediction signal generation method controller 102, the frame memory 103, the prediction signal generator 104, the subtractor 105, the transform/quantization unit 106, the encoder 107, the de-quantization/inverse-transform unit 108, the adder 109, and the output unit 110, which are described above.

Figure 17:
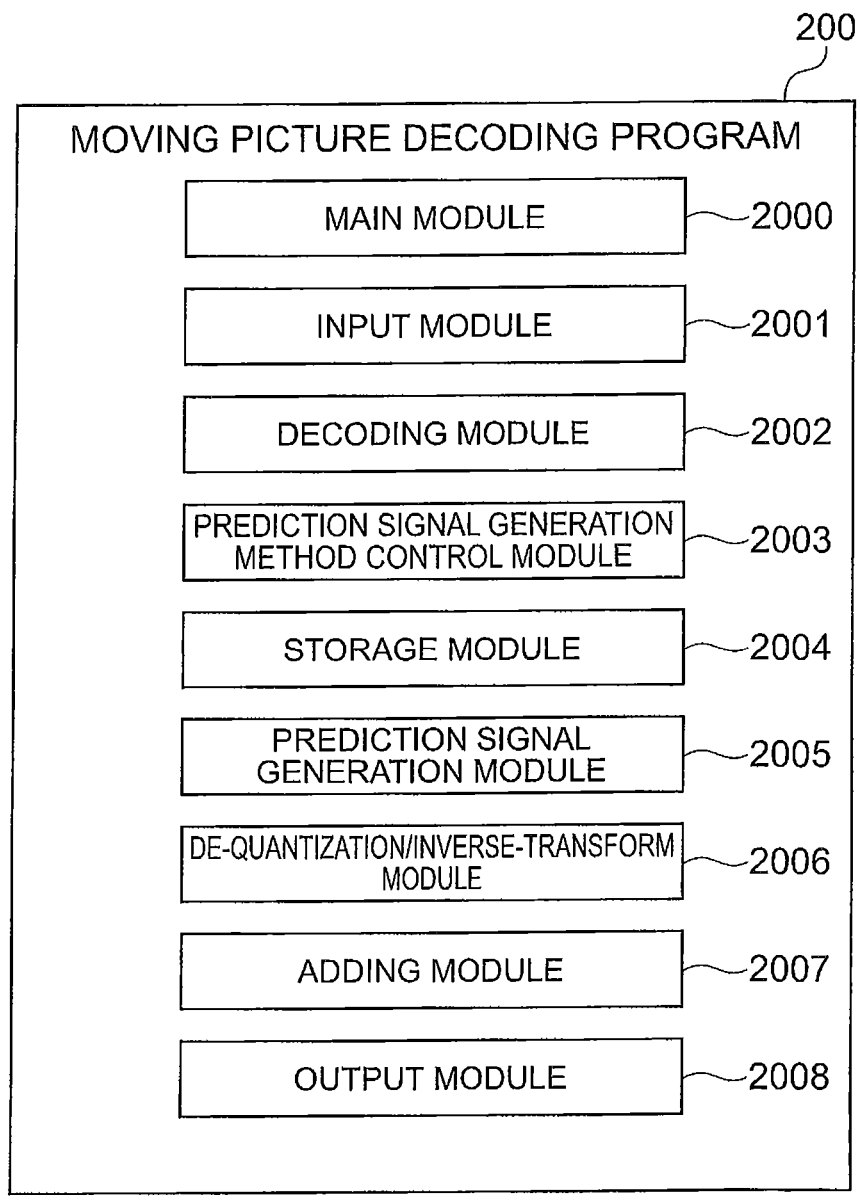
FIG. 17 is a schematic illustrating a structure of a moving picture decoding program according to an example embodiment.

Next, by using FIG. 17, a moving picture decoding program 200 to cause a computer to operate as the moving picture decoding device 1000 is described. As illustrated in FIG. 17, the moving picture decoding program 200 includes a main module 2000 that controls processing, an input module 2001, a decoding module 2002, a prediction signal generation method control module 2003, a storage module 2004, a prediction signal generation module 2005, a de-quantization/inverse-transform module 2006, an adding module 2007, and an output module 2008. The respective functions that the input module 2001, the decoding module 2002, the prediction signal generation method control module 2003, the storage module 2004, the prediction signal generation module 2005, the de-quantization/inverse-transform module 2006, the adding module 2007, and the output module 2008 cause a computer to operate as are the same as the respective functions of the input unit 1001, the decoder 1002, the prediction signal generation method controller 1003, the frame memory 1004, the prediction signal generator 1005, the de-quantization/inverse-transform unit 1006, the adder 1007, and the output unit 1008, which are described above.

The moving picture encoding program 190 and the moving picture decoding program 200 thus structured are stored in a recording medium 10 illustrated in FIG. 42, and executed by a computer 30 described later. Alternatively or in addition, at least a portion of the previously described picture encoding program 190 and the picture decoding program 200 may be stored in a working memory, and/or a memory, which are also non-transitory computer readable mediums.

Figure 42:
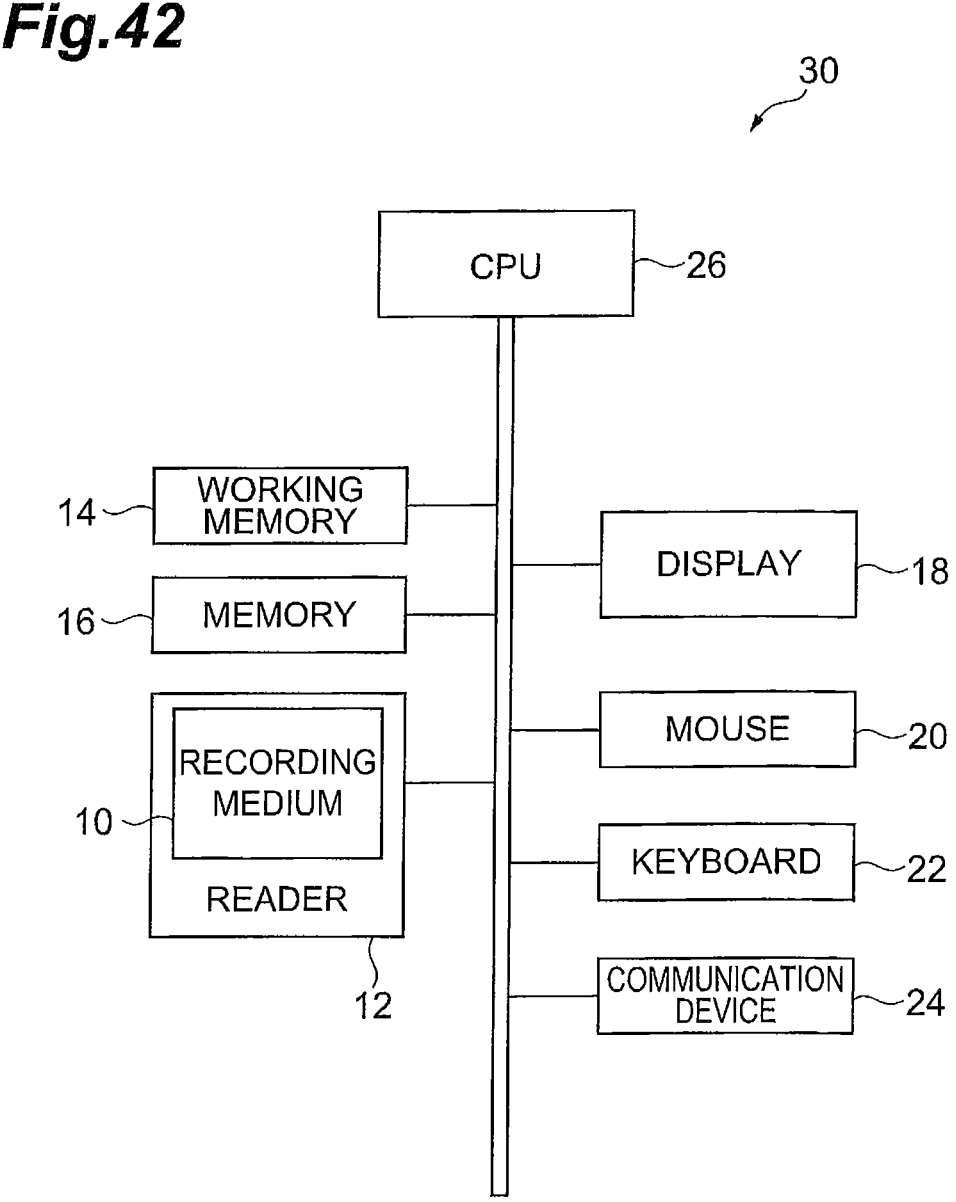
FIG. 42 is an example of a hardware structural view of a computer executing a program stored in a recording medium.
Figure 43:
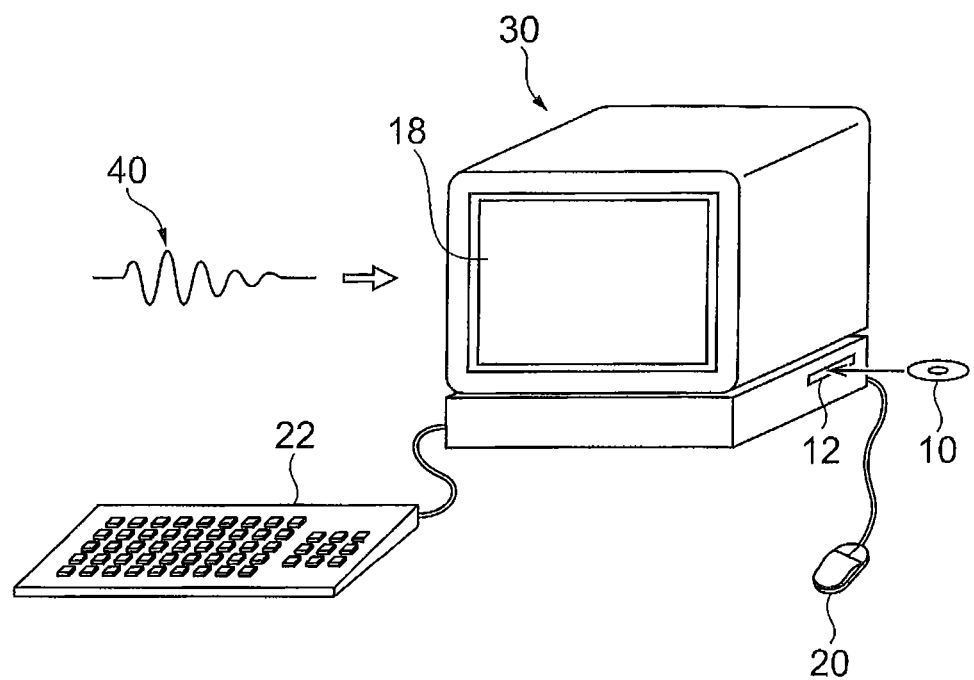
FIG. 43 is a perspective view of the example computer of FIG. 42.

FIG. 42 is a schematic illustrating an example hardware configuration of a computer for executing a program, such as a program recorded in a recording medium and/or a computer readable medium. FIG. 43 is a perspective view of an example computer for executing a program stored in a recording medium. Although illustrated in FIG. 43 in the form of a personal computer, the computer may be configured as any device, or combination of devices, such as DVD players, set top boxes, and cell-phones each of which is provided with a CPU and performs processing and control with software.

As illustrated in the example of FIG. 42, the computer 30 includes a reader 12 such as a flexible disk drive device, a CD-ROM drive device, and a DVD drive device, a communication port such as a universal serial bus port (USB), Bluetooth port, an infrared communication port, or any other type of communication port that allows communication with an external device, such as another computer or memory device. The computer 30 may also include a working memory 14 that may include a resident operating system, and a memory 16 that stores data such as at least part of a program stored in the recording medium 10. The working memory 14 and memory 16 may be one or more computer readable medium, and can include a solid-state memory such as a memory card or other package that houses one or more non-volatile read-only memories. Further, the computer readable medium can be a random access memory or other volatile re-writable memory. Additionally or alternatively, the computer-readable medium can include a magneto-optical or optical medium, such as a disk or tapes or any other storage device to capture carrier wave signals such as a signal communicated over a transmission medium. A digital file attachment to an e-mail, stored in a storage device, or other self-contained information archive or set of archives may be considered a distribution medium that is a tangible storage medium. Accordingly, the embodiments are considered to include any one or more of a computer-readable medium or a distribution medium and other equivalents and successor media, in which data or instructions may be stored. In addition, the computer 30 may have a user interface that includes a display 18, a mouse 20 and a keyboard 22 both of which are input devices, a touch screen display, a microphone for receipt of voice commands, a sensor, or any other mechanism or device that allows a user to interface with the computer 30. In addition, the computer 30 may include a communications device 24 for transmitting and receiving data and the like, and a central processing unit (CPU) 26 or processor that controls the execution of the program. The processor 26 may be one or more one or more general processors, digital signal processors, application specific integrated circuits, field programmable gate arrays, digital circuits, analog circuits, combinations thereof, and/or other now known or later developed devices for analyzing and processing data. In one example, upon insertion of the recording medium 10 into the reader 12, the computer 30 is provided access via the reader 12 to the moving picture encoding program 190, at least a portion of which is stored in the recording medium 10. With the moving picture encoding program 190, the computer 30 can operate as the moving picture encoding device according to example embodiment. In addition, upon insertion of the recording medium 10 into the reader 12, at least a portion of the computer 30 becomes accessible to the moving picture decoding program 200 stored in the recording medium 10 from the reader 12. With the moving picture decoding program 200, the computer 30 can operate as the moving picture decoding device according to one example embodiment. In other examples, the recording medium 10 provides enablement or initialization of the picture encoding program P100 and/or picture decoding program P900 stored in at least one of the working memory 14 and the memory 16.

As illustrated in the example of FIG. 43, the moving picture encoding program and the moving picture decoding program may be provided through a network as a computer data signal 40 superimposed on a carrier wave. In this case, the computer 30 stores at least a portion of the moving picture encoding program or the moving picture decoding program received by the communications device 24 in the memory 16, and can execute the moving picture encoding program or the moving picture decoding program following storage in the non-transitory computer readable medium.

Operations and Effects According to the Present Embodiment

Here, the operations and effects of the moving picture encoding device 100 according to the present embodiment are described. In the moving picture encoding device 100, when prediction-encoding a target block of an encoding target frame picture, the prediction signal generation method controller 102 determines a processing method by which a residual signal becomes minimum by combining a plurality of previously determined processes for every reference picture, and the prediction signal generator 104 performs processing on a reference picture based on the determined processing method so as to generate a prediction signal, thereby enabling provision of a preferred prediction signal suitable for the target block of the encoding target frame picture and perform encoding with high efficiency.

Next, the operations and effects of the moving picture decoding device 1000 according to the present embodiment are described. In the moving picture decoding device 1000, when prediction-decoding a target block of a decoding target frame picture, the prediction signal generation method controller 1003 decodes a processing method by which a residual signal becomes minimum by combining a plurality of preliminarily determined processes for every reference picture, and the prediction signal generator 1005 performs processing on a reference picture based on the decoded processing method so as to generate a prediction signal, thereby enabling provision of a preferred prediction signal suitable for the target block of the decoding target frame picture and performance of decoding with high efficiency.

In the moving picture encoding device and the moving picture decoding device according to the present embodiment, the method for identifying a plurality of reconstructed reference pictures is not limited to the above-described reference list. Any method may be employed as long as the method uniquely identifies a reference picture. When a plurality of reference pictures are identified by using the reference list, the correspondence between a reference list and a frame buffer number of a frame buffer storing a reference list number and a reference picture is not limited to the above-described method. In addition, the correspondence between the reference list number and the code of the reference list number is not limited to the above-described method. When the moving picture encoding device according to the present embodiment performs prediction encoding by bidirectional prediction, and the moving picture decoding device according to the present embodiment performs prediction decoding by bidirectional prediction, the device may produce a reference list for every forward prediction and backward prediction, and may encode (or decode) a reference list number of each prediction direction and information on a processing method to be performed on a reference picture together.

As for the accuracy of pixel interpolation, the type of pixel interpolation filter, and the calculation rounding method in pixel interpolation that the moving picture encoding device and the moving picture decoding device according to the present embodiment perform on a reference picture, the processing methods are not limited to the above-described methods. In each type of processing that the moving picture encoding device and the moving picture decoding device according to the present embodiment perform on a reference picture, the relationship between the processing method and the code is not limited to the above. The type of processing that the moving picture encoding device and the moving picture decoding device according to the present embodiment perform on a reference picture may be at least one or more type, and the type of each processing may include at least two or more processing methods.

The moving picture encoding device and the moving picture decoding device according to the present embodiment may perform different processing on a same reference picture stored in a frame buffer having a frame buffer number corresponding to a same reference list number so as to produce different prediction signals.

The types of processing regarding accuracy of pixel interpolation, types of pixel interpolation filters, and rounding calculation methods used in pixel interpolation, which are performed by the moving picture encoding device and the moving picture decoding device according to the present embodiment on a reference picture to generate a prediction signal, are not limited thereto. Filters of types applied to integer pixel positions may be used. A method regarding execution or non-execution of global motion compensation may be used. A method regarding execution or non-execution of affine transformation may be used.

The information regarding the processing method, which the moving picture encoding device and the moving picture decoding device according to the present embodiment perform on a reference picture to generate a prediction signal, may include information that indicates, for the respective reference pictures, whether or not to execute prediction which uses luminance compensation to change the brightness of a pixel value. FIG. 18 is a table of a list illustrating execution or non-execution of luminance compensation prediction. FIG. 19 is a table of list numbers of execution or non-execution of luminance compensation and the codes used when the list numbers of execution or non-execution of luminance compensation are encoded. FIG. 20 is a schematic showing data representing a prediction signal generation method, which includes information on execution or non-execution of luminance compensation, performed on a reference picture when the list number of the type of pixel interpolation filter is other than 2 or 3.

The data representing a prediction signal generation method, which is decoded by the moving picture decoding device according to the present embodiment, may include information as to whether or not to execute prediction which uses luminance compensation that changes the brightness of a pixel. The data is the same as shown in FIG. 20 which represents a prediction signal generation method, which includes information on execution or non-execution of luminance compensation, performed on a reference picture when the list number of the type of pixel interpolation filter is other than 2 or 3. FIG. 21 is a table of codes and the list numbers of execution or non-execution of luminance compensation used when the list numbers of execution or non-execution of luminance compensation are decoded. FIG. 22 is a table of a list illustrating execution or non-execution of luminance compensation prediction.

Modification Example 1 of the Above-Described Embodiment

Next, a modification example 1 of the above-described embodiment is described with reference to FIGS. 23 to 29, FIG. 38, and FIG. 39. In each drawing, same or equivalent parts are appended with the same numerals.

Moving Picture Encoding Device and Moving Picture Encoding Method

A moving picture encoding device according to a modification example 1 of the above-described embodiment is the same as the moving picture encoding device 100 of the above-described embodiment except for the function of the encoder 107. Accordingly, only the encoder 107 is described.

Figure 24:
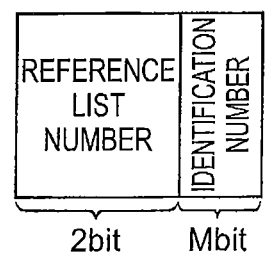
FIG. 24 is a schematic of an example of prediction signal generation method encoded data.
Figure 26:
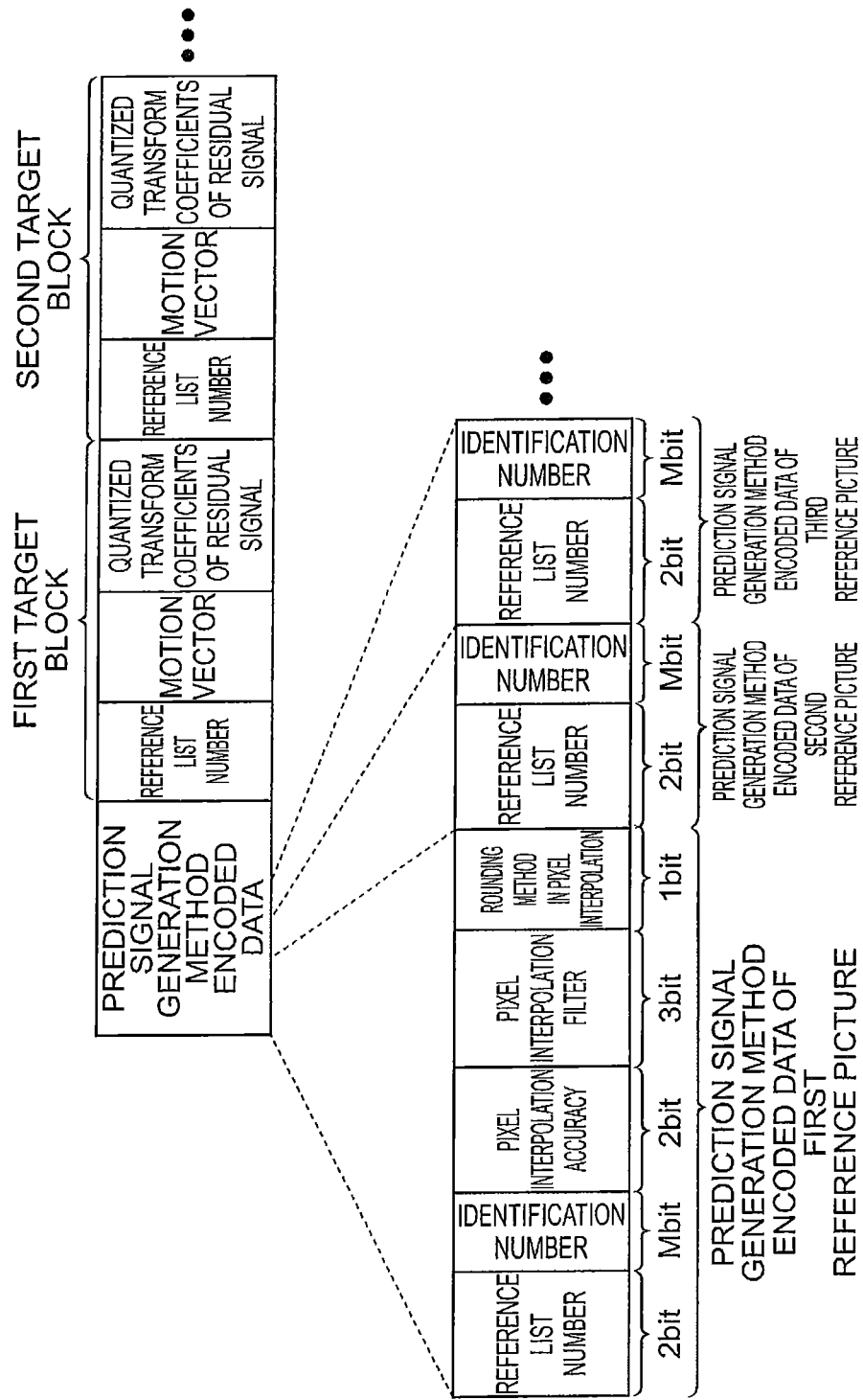
FIG. 26 is a schematic of an example of encoded data.

The encoder 107 stores previously encoded information on a processing method for generating a prediction signal together with an identification number. FIG. 23 is a schematic illustrating identification numbers and information on a processing method for prediction signal generation corresponding to the identification numbers that are stored in the encoder 107. The encoder 107 encodes a reference list number and information on a processing method for generating a corresponding prediction signal received from the prediction signal generation method controller 102. FIG. 4 illustrates a table of reference list numbers and their codes. The encoder 107 compares the information on a processing method for prediction signal generation with previously used information on a processing method for producing a reference picture, and determines an identification number of a generation method. Specifically, when information on a processing method performed on a reference picture of a certain reference list number for generating a prediction signal is the same as past information on a processing method used for encoding a frame picture, the encoder 107 determines the identification number of the previous processing method as an identification number of a generation method. When information on a processing method performed on a reference picture of a certain reference list number for generating a prediction signal differs from previously used information on a processing method, the encoder 107 determines a new number as an identification number of a generation method in ascending order. Then, the encoder 107 encodes, for every reference list number of reference picture, an identification number only when a same processing method is previously used as information on a processing method for prediction signal generation, and outputs the encoded identification number to the prediction signal generation method controller 102 through the line L113. In contrast, when a same processing method is not previously used, the encoder 107 encodes an identification number and a content of the corresponding processing method (combination of processes), and outputs the encoded identification number and the content to the prediction signal generation method controller 102 through the line L113. The tables of codes corresponding to the contents of processing methods are illustrated in FIG. 5. FIG. 24 illustrates a schematic of prediction signal generation method encoded data when a same processing method is previously used as information on a processing method for prediction signal generation. FIG. 25 illustrates a schematic of prediction signal generation method encoded data when a same processing method is not previously used as information on a processing method for prediction signal generation. Then, when a same processing method is not previously used as information on a processing method for prediction signal generation, the encoder 107 stores new information on a processing method for generating a prediction signal together with an identification number. Thereafter, the encoder 107 encodes, for every target block of an encoding target frame picture, a reference list number and a motion vector for prediction signal generation, and quantized transform coefficients of residual signal, and outputs the encoded reference list number, motion vector, and quantized transform coefficients of residual signal to the output unit 110 together with the above-described prediction signal generation method encoded data. FIG. 26 is a schematic of encoded data. In FIG. 26, an example is illustrated in which information on a processing method for generating a prediction signal of a first reference picture differs from previously encoded information on a processing method for prediction signal generation, while information on a processing method for generating a prediction signal of second and third reference pictures is similar to previously encoded information on a processing method for prediction signal generation.

A moving picture encoding method according to the modification example 1 is a process performed by the encoder 107 to encode prediction signal generation method information. Therefore, processing to encode prediction signal generation method information is described using FIG. 38.

Figure 38:
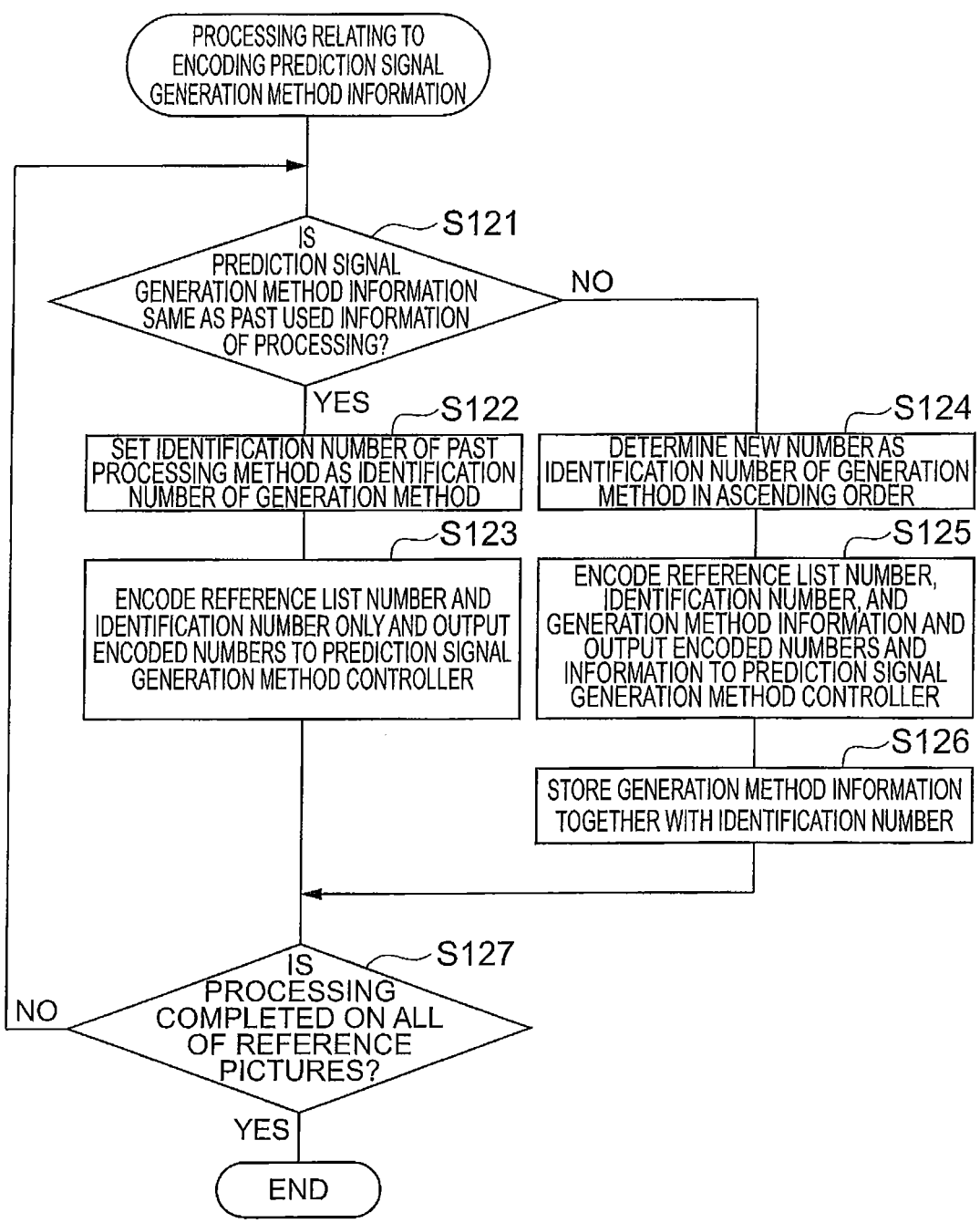
FIG. 38 is a flowchart illustrating an example of processing relating to encoding prediction signal generation method information in a modification example 1.

As illustrated in FIG. 38, the encoder 107 determines whether or not information on a processing method performed on a reference picture for generating a prediction signal (prediction signal generation method information) is similar to previously used information on a processing method (step S121). If the prediction signal generation method information is not similar to previously used information on a processing method (NO in step S121), the encoder 107 determines a new number as an identification number of a generation method in ascending order (step S124); encodes a reference list number, the determined new identification number, and the prediction signal generation method information; outputs encoded numbers and information to the prediction signal generation method controller 102 through the line L113 (step S125); and then stores the prediction signal generation method information together with the new identification number (step S126).

In contrast, if the prediction signal generation method information is similar to the previously used information on a processing method (YES in step S121), the encoder 107 sets the identification number of the previously used processing method as an identification number of a prediction signal generation method (step S122); encodes only a reference list number and the set identification number; and outputs the encoded numbers to the prediction signal generation method controller 102 through the line L113 (step S123).

Then, the encoder 107 determines whether or not the above-described processing from steps S121 to S126 is completed on all of the reference pictures (step S127). If a reference picture remains unprocessed (NO in step S127), the encoder 107 repeats processing from steps S121 to S126 on the unprocessed reference picture. In contrast, if processing is completed on all of the reference pictures (YES in step S127), the encoder 107 ends processing of FIG. 38.

The structure of a moving picture encoding program according to the modification example 1 is similar to the structure of the moving picture encoding program of the above-described embodiment (FIG. 16). Therefore, description thereof is omitted. In this regard, the operation of the encoder 107, of which the encoding module 1907 causes a computer to operate, is according to the modification example 1.

Moving Picture Decoding Device and Moving Picture Decoding Method

Next, a moving picture decoding device according to the modification example 1 of the above-described embodiment is described. The moving picture decoding device according to the modification example 1 of the above-described embodiment is similar to the moving picture decoding device 1000 of the above-described embodiment except for the decoder 1002. Accordingly, only the decoder 1002 is described.

The decoder 1002 stores previously decoded information on a processing method for prediction signal generation together with an identification number. The identification number and information on a processing method for prediction signal generation corresponding to the identification number that are stored in the decoder 1002 are similar to the aforementioned information illustrated in FIG. 23. The decoder 1002 decodes information on a processing method for prediction signal generation for every reference picture before decoding the first target block of a decoding target frame picture from encoded data input through the input unit 101. The encoded data that is a decoding target is similar to the aforementioned encoded data illustrated in FIG. 26. The decoder 1002 decodes, for every reference picture, its reference list number and identification number of a generation method. Then, the decoder 1002 determines whether or not the decoded identification number is a previously decoded identification number of information on a processing method for prediction signal generation. When the decoded identification number is a previously decoded identification number of information on a processing method for prediction signal generation, the decoder 1002 outputs stored information on a processing method for prediction signal generation having the same identification number to the prediction signal generation method controller 1003 through the line L1010. When the decoded identification number differs from a previously decoded identification number of information on a processing method for prediction signal generation, the decoder 1002 decodes a subsequent code so as to acquire information on a processing method for prediction signal generation, and outputs the acquired information to the prediction signal generation method controller 1003 through the line L1010. At this time, the decoder 1002 stores newly decoded information on a processing method for prediction signal generation together with the decoded identification number. The decoder 1002 performs the above-described processing to the number of reference pictures. Then, the decoder 1002 decodes, for every target block of a decoding target frame picture, a reference list number of a reference picture used for generating a prediction signal, and outputs the decoded reference list number to the prediction signal generation method controller 1003 and the frame memory 1004 through the line L1011. Then, the decoder 1002 decodes a motion vector used for generating a prediction signal and outputs the decoded motion vector to the frame memory 1004 through the line L1012. Then, the decoder 1002 decodes quantized transform coefficients of residual signal, and outputs the decoded signal to the de-quantization/inverse-transform unit 1006.

A moving picture decoding method according to the modification example 1 is a process performed by the decoder 1002 to decode prediction signal generation method information. Therefore, processing to decode prediction signal generation method information is described by FIG. 39.

Figure 39:
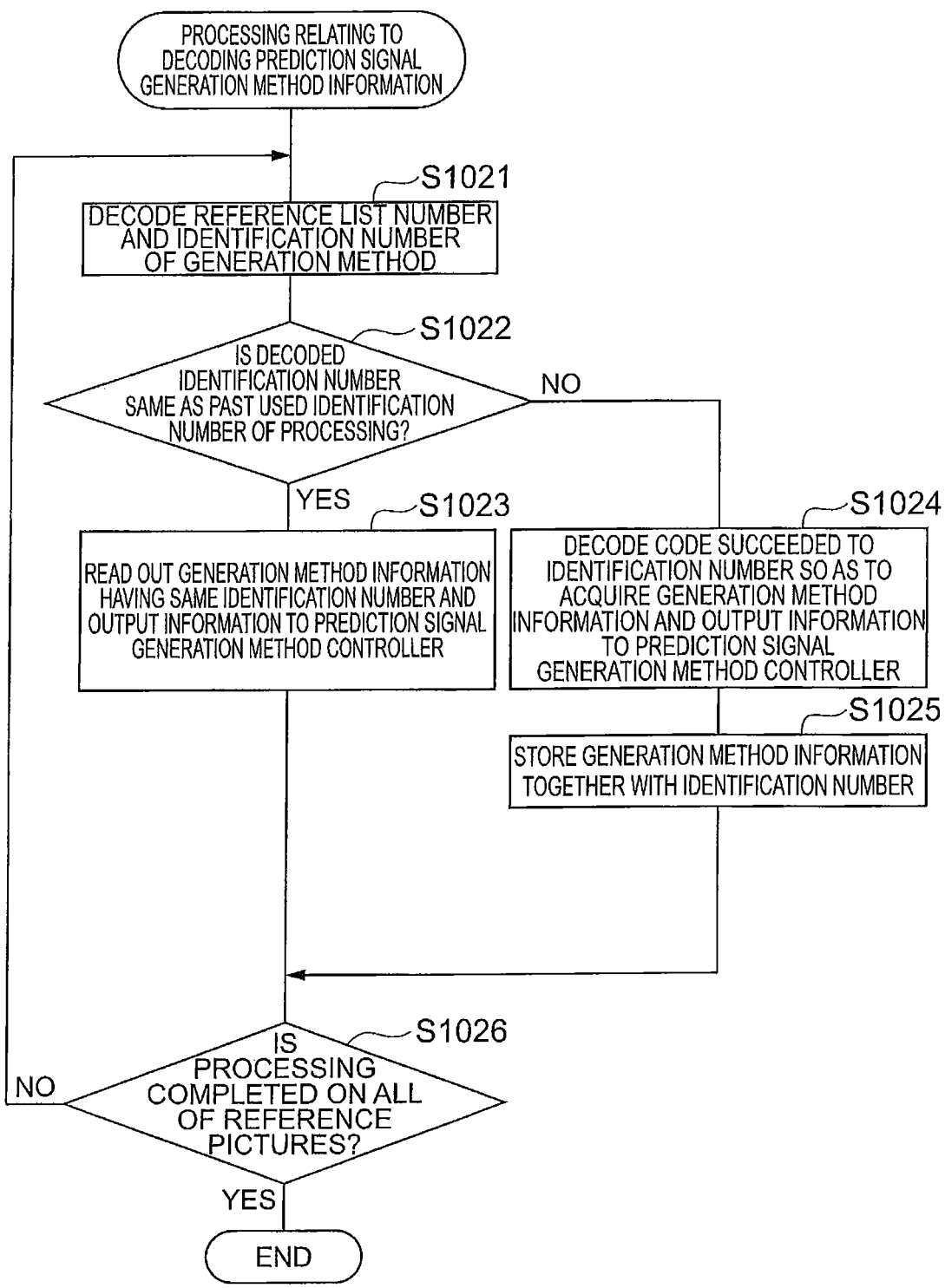
FIG. 39 is a flowchart illustrating an example of processing relating to decoding prediction signal generation method information in the modification example 1.

As illustrated in FIG. 39, the decoder 1002 decodes a reference list number and an identification number of a prediction signal generation method of a reference picture of a certain reference list number (step S1021), and determines whether or not the decoded identification number is similar to a previously used identification number of a processing method (step S1022). If the decoded identification number is not the same as a previously used identification number of a processing method (NO in step S1022), the decoder 1002 decodes a code succeeding the identification number so as to acquire prediction signal generation method information, outputs the acquired information to the prediction signal generation method controller 1003 through the line L1010 (step S1024), and stores the above-described prediction signal generation method information together with the identification number (step S1025).

In contrast, if the decoded identification number is the same as a previously used identification number of a processing method (YES in step S1022), the decoder 1002 reads out stored prediction signal generation method information having the same identification number, and outputs the information to the prediction signal generation method controller 1003 through the line L1010 (step S1023).

Then, the decoder 1002 determines whether or not the above-described processing from steps S1021 to S1025 is completed on all of the reference pictures (step S1026). If a reference picture remains unprocessed (NO in step S1026), the decoder 1002 repeats processing from steps S1021 to S1025 on the unprocessed reference picture. In contrast, if processing is completed on all of the reference pictures (YES in step S1026), the decoder 1002 ends processing of FIG. 39.

The structure of a moving picture decoding program according to the modification example 1 is similar to the structure of the moving picture decoding program of the above-described embodiment (FIG. 17). Therefore, description thereof is omitted. In this regard, the operation of the decoder 1002, of which the decoding module 2002 causes a computer to operate, is according to the modification example 1.

Operations and Effects of the Modification Example 1

Here, the operations and effects of the moving picture encoding device 100 according to the modification example 1 are described. In the moving picture encoding device 100, when prediction-encoding a target block of an encoding target frame picture, the prediction signal generation method controller 102 determines a processing method (combination of processes) by which a residual signal becomes minimum by combining a plurality of preliminarily determined processes for every reference picture, and the prediction signal generator 104 performs processing on a reference picture based on the determined processing method so as to generate a prediction signal, thereby enabling provision of a preferred prediction signal suitable for a target block of an encoding target frame picture and performance of encoding with high efficiency. In addition, the encoder 107 encodes, for every reference picture, information on a processing method for prediction signal generation together with an identification number, and encodes only the identification number when the information on a processing method for prediction signal generation is the same as previously encoded information on a processing method for prediction signal generation. As a result, the encoder 107 can encode information on a processing method for prediction signal generation with little encoded data.

The operations and effects of the moving picture decoding device 1000 according to the modification example 1 are described. In the moving picture decoding device 1000 when prediction-decoding a target block of a decoding target frame picture, the prediction signal generation method controller 1003 decodes a processing method by which a residual signal becomes minimum (combination of processes) for every reference picture, and the prediction signal generator 1005 performs processing on a reference picture based on the decoded processing method so as to generate a prediction signal, thereby enabling to provide a preferred prediction signal suitable for a target block of a decoding target frame picture and perform decoding with high efficiency. In addition, the decoder 1002 decodes, for every reference picture, information on a processing method for prediction signal generation together with an identification number, and decodes only the identification number when the information on a processing method for prediction signal generation is the same as previously decoded information on a processing method for prediction signal generation. As a result, the decoder 1002 can decode information on a processing method for prediction signal generation with little encoded data.

In the moving picture encoding device and moving picture decoding device according to the modification example 1 of the present embodiment, the encoder 107 and the decoder 1002 may preliminarily store, in common, some identification numbers and information on processing methods for prediction signal generation corresponding to the identification numbers. Accordingly, the case in which only a reference list number and an identification number need to be encoded and decoded as reference picture generation method encoded data increases. The moving picture encoding device and the moving picture decoding device can encode and decode information with a processing method for producing a reference picture with less encoded data. Alternatively, an identification number and information on a processing method for prediction signal generation corresponding to the identification number may be stored in common in the encoder 107 and the decoder 1002 by a different method from being encoded and decoded so as to be included in encoded data.

In the moving picture encoding device and the moving picture decoding device according to the modification example 1 of the present embodiment, even when an encoded and decoded identification number and information on a processing method for prediction signal generation corresponding to the identification number differs from previously encoded and decoded identification number and information on a processing method for prediction signal generation corresponding to the identification number, the encoded and decoded identification number and the information may overwrite the previously encoded and decoded identification number and information on a processing method for prediction signal generation corresponding to the identification number without being added as a new identification number to the encoder 107 and the decoder 1002. In this case, prediction signal generation method encoded data includes, in front of a code representing an identification number, information regarding whether or not an overwriting has been executed on an existing identification number and information on a processing method for prediction signal generation corresponding to the existing identification number. The moving picture encoding device encodes and adds the information using the encoder 107 while the moving picture decoding device decodes the information using the decoder 1002. FIG. 27 is a schematic of prediction signal generation method encoded data including information representing whether or not an overwriting is executed on an existing identification number and information on a processing method for prediction signal generation corresponding to the identification number. Accordingly, when the number of types of information on a processing method for prediction signal generation increases, an identification number can be reutilized by being overwritten. As a result, the quantity of new identification numbers does not need to increase, and an identification number can be encoded and decoded with a short code length.

In the moving picture encoding device and the moving picture decoding device according to the modification example 1 of the present embodiment, information for entirely resetting previously encoded and decoded identification number and information on a processing method for prediction signal generation corresponding to the identification number stored in the encoder 107 and the decoder 1002 to an initial state may be included in the prediction signal generation method encoded data. Encoding and decoding may be performed on the prediction signal generation method encoded data. FIG. 28 is a schematic of prediction signal generation method encoded data including information for entirely resetting to an initial state previously encoded and decoded identification number and information on a processing method for prediction signal generation corresponding to the identification number. Accordingly, previously encoded and decoded information on a processing method for prediction signal generation can be initialized one time so as to be used for encoding and decoding without sequentially being overwritten.

Figure 29:
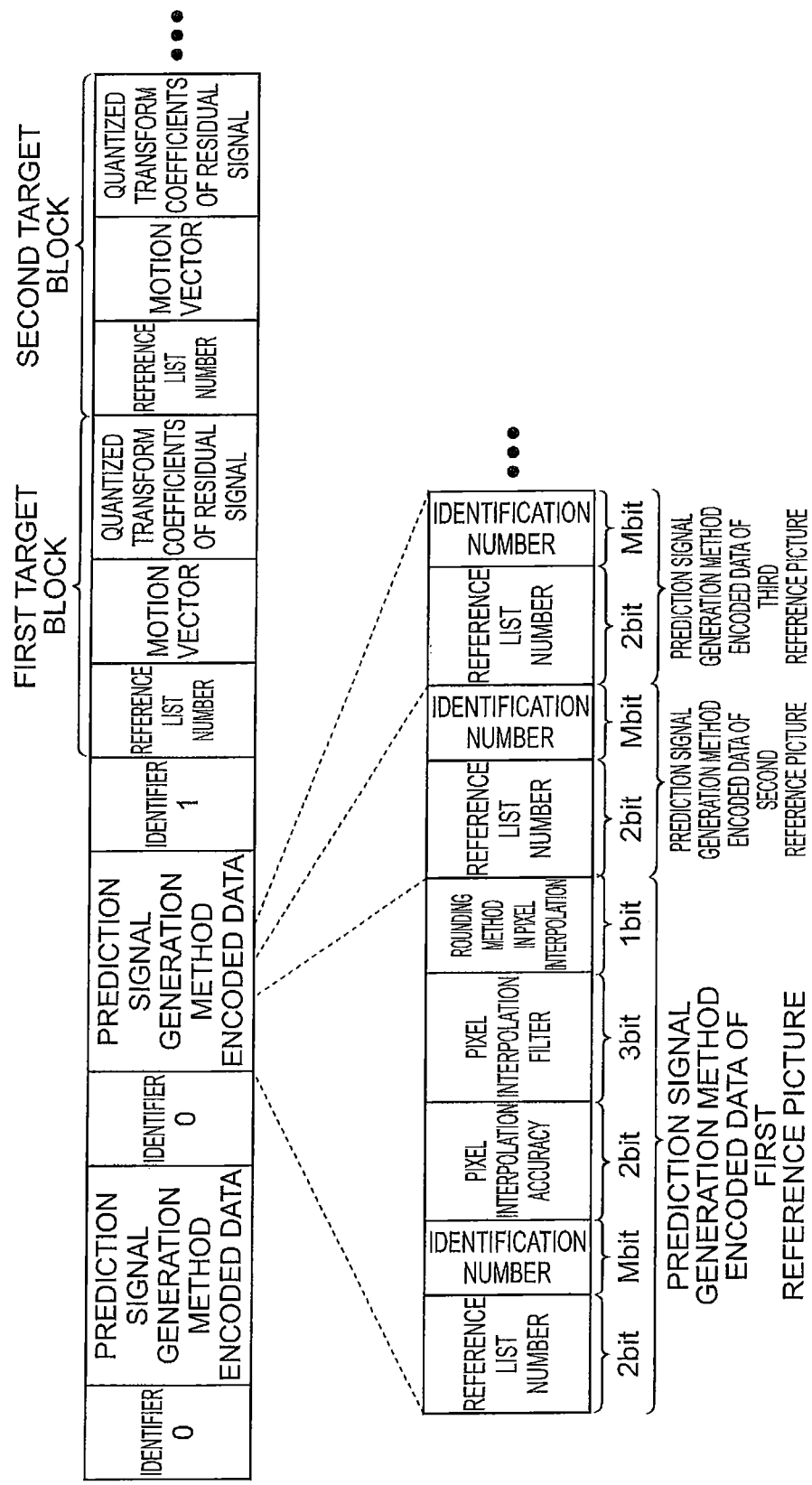
FIG. 29 is a schematic of an example of prediction signal generation method encoded data.

In the moving picture encoding device according to the modification example 1 of the present embodiment, the encoder 107 encodes and outputs data representing a prediction signal generation method once for one frame picture to be encoded. However, the moving image encoding/decoding system is not limited thereto. The encoder 107 may encode and output data representing a prediction signal generation method once for multiple frame pictures to be encoded or multiple times for one frame picture to be encoded. In the moving picture decoding device according to the modification example 1 of the present embodiment, the decoder 1002 decodes data representing a prediction signal generation method once for one frame picture to be decoded. However, the moving image encoding/decoding system is not limited thereto. The decoder 1002 may decode data representing a prediction signal generation method once for a plurality of frame pictures to be decoded or multiple times for one frame picture to be decoded. In this case, the encoder 107 inserts an identifier identifying a type of encoded data in front of the data representing a prediction signal generation method and a code of a reference list number of the first target block. Specifically, the encoder 107 inserts a code "0" when a subsequent code is the data representing a prediction signal generation method, or inserts a code "1" when a subsequent code is a reference list number that is the beginning of encoded data of a target block. The decoder 1002 decodes, for the respective frame pictures, the identifier identifying a type of encoded data before decoding a reference list number of the first target block. While decoding, the decoder 1002 recognizes that the subsequent code is the data representing a prediction signal generation method when the code is "0", or recognizes that the subsequent code is a reference list number that is encoded data of a target block when the code is "1". FIG. 29 is a schematic showing encoded data generated when the data representing a prediction signal generation method is encoded and decoded at multiple times for one frame picture. Accordingly, an amount of data to be encoded and decoded can be reduced when the encoder 107 and the decoder 1002 encodes and decodes information on a processing method for producing a reference picture once for a plurality of frame pictures. When information on a processing method for producing a reference picture is encoded or decided at a plurality of times all at once, information on a processing method for producing a reference picture is encoded or decoded all at once before some frame pictures are encoded or decoded. As a result, the processing can proceed without performing different processes alternatively.

Modification Example 2 of the Above-Described Embodiment

Next, a modification example 2 of the above-described embodiment is described by using FIGS. 30 to 37, FIG. 40, and FIG. 41. In each drawing, same or equivalent parts are appended with the same numerals.

Moving Picture Encoding Device and Moving Picture Encoding Method

A moving picture encoding device according to a modification example 2 of the above-described embodiment is similar to the moving picture encoding device 100 of the above-described embodiment except for operation of the encoder 107. Accordingly, only the encoder 107 is described.

Figure 31:
FIG. 31 is a schematic of an example of prediction signal generation method encoded data.
Figure 32:
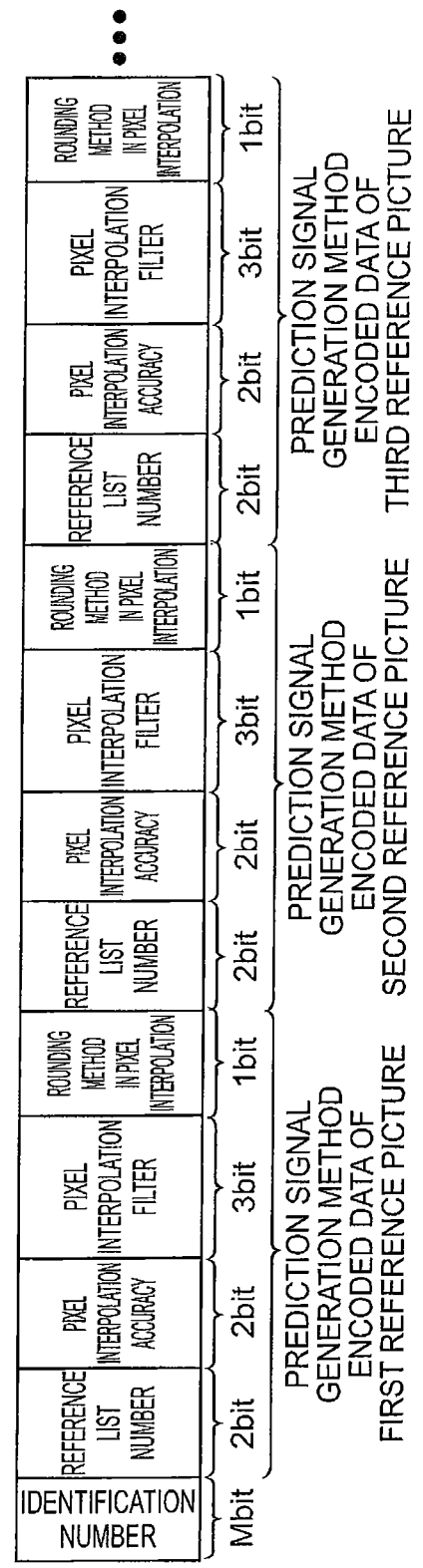
FIG. 32 is a schematic of an example of prediction signal generation method encoded data.
Figure 33:
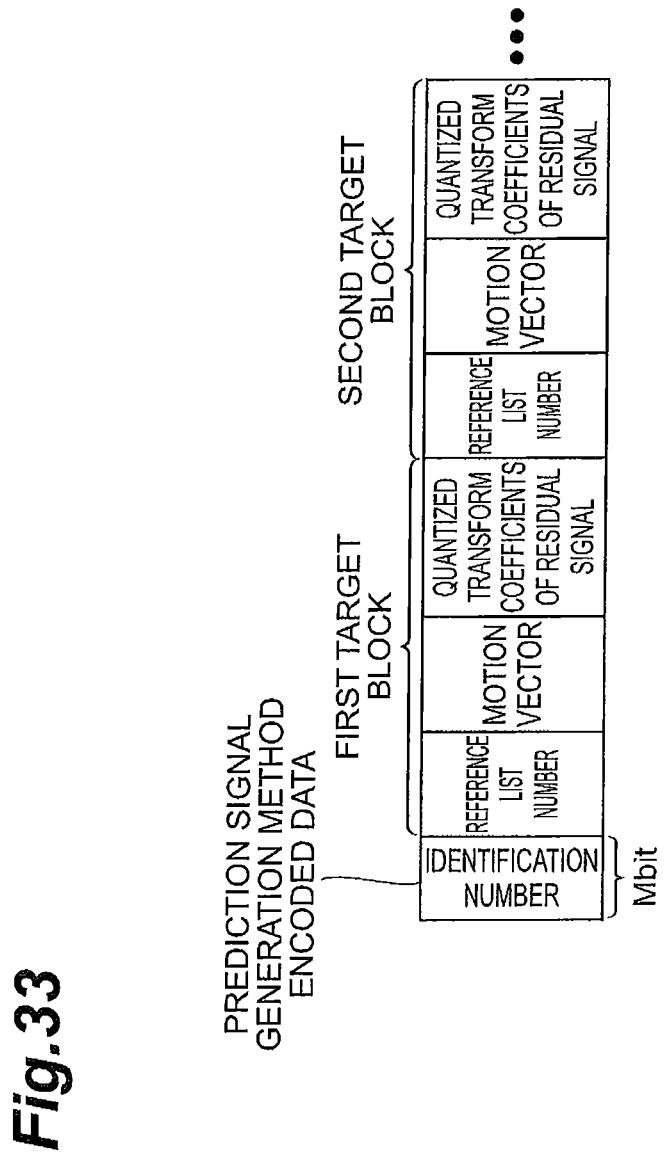
FIG. 33 is a schematic of an example of encoded data.
Figure 34:
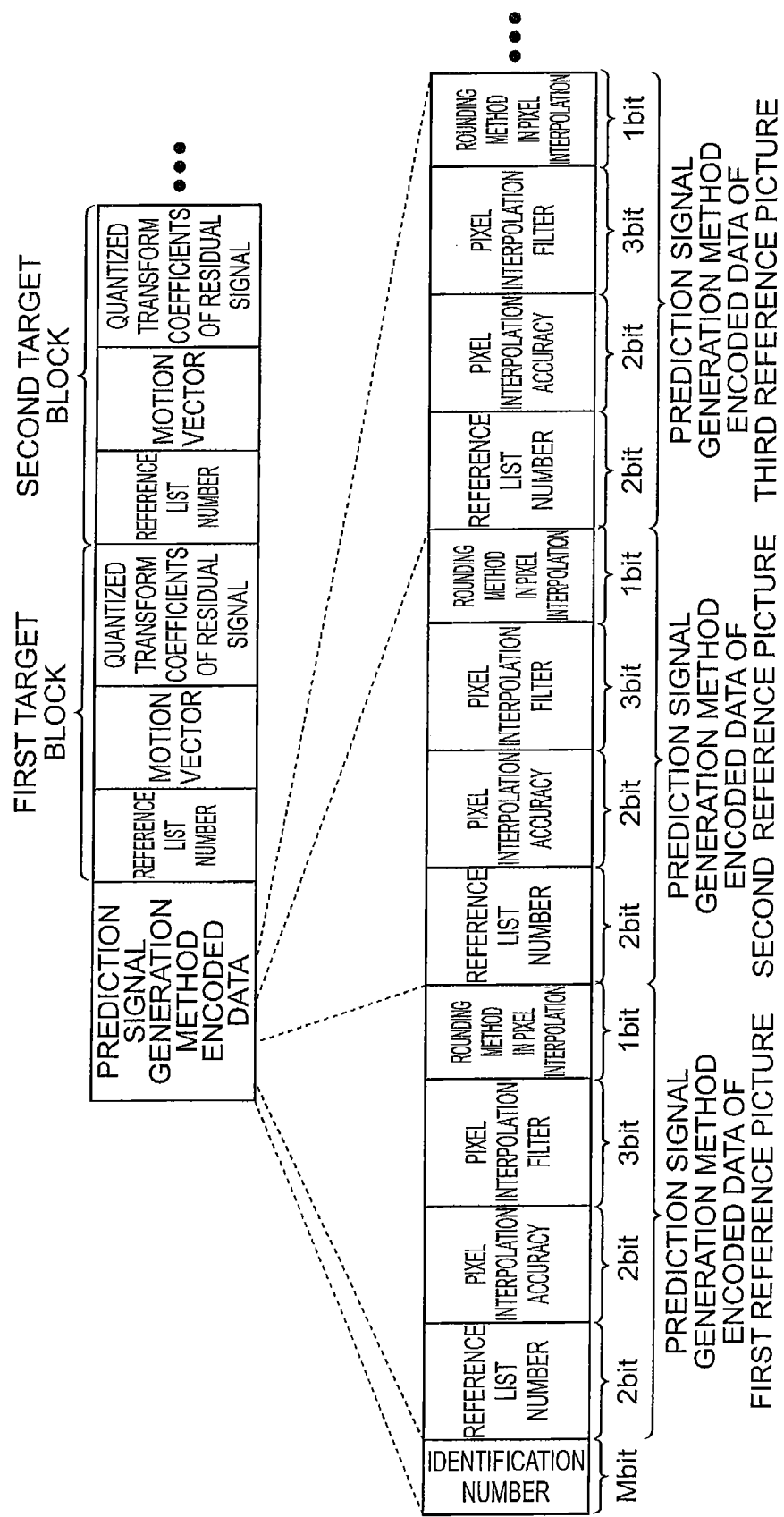
FIG. 34 is a schematic of an example of encoded data.

The encoder 107 stores a group of information on previously encoded processing methods (a combination of processes) for generating prediction signals, together with identification numbers. FIG. 30 is a schematic illustrating the identification numbers, and the group of information on a processing method for generating prediction signals with respect to all of the reference list numbers corresponding thereto, which are stored in the encoder 107. The encoder 107 compares a group of information on a processing method for prediction signal generation with respect to all of the reference list numbers received from the prediction signal generation method controller 102, with a group of information on a previously used processing method for producing a group of reference pictures, and determines an identification number for the generation method. Specifically, when a group of information on a processing method to be performed on a group of reference pictures represented by reference list numbers are similar to a group of information on a processing method used for encoding a past frame picture, the encoder 107 assigns the identification number of the past processing methods to the generation methods to be performed. Alternatively, when even a piece of information among a group of information of processing methods for generating prediction signals to be performed on a group of reference pictures represented by reference list numbers for prediction signal generation differs from the information on previously used processing methods, the encoder 107 assigns a new number to the generation methods to be performed. Then, for a group of information whose reference numbers are all compared, the encoder 107 encodes only an identification number as a group of information on a processing method for prediction signal generation when the same processing was previously used, while encoding an identification number and contents of the corresponding processes when the same processing was not previously used, and outputs the encoded identification number and contents to the prediction signal generation method controller 102 through the line L113. The tables of codes corresponding to the contents of processes are illustrated in FIG. 5. FIG. 31 is a schematic showing data representing a prediction signal generation method which replaces a group of information for a processing method for prediction signal generation with respect to all of the reference list numbers when the same processing method was previously used as FIG. 32 is a schematic showing data representing a prediction signal generation method with respect to all of the reference list numbers when the same processing method was not previously used as a group of information for a processing method for prediction signal generation. When the same processing is not previously used as a group of information for a processing method for prediction signal generation, the encoder 107 stores a new group of information on a processing method for prediction signal generation together with a new identification number. Thereafter, the encoder 107 encodes, for every target block of an encoding target frame picture, a reference list number and a motion vector for generating a prediction signal, and quantized transform coefficients of residual signal, and outputs the encoded reference list number, motion vector, and quantized transform coefficients of residual signal to the output unit 110, together with the above-described prediction signal generation method encoded data. FIG. 33 is a schematic showing encoded data when a group of information on a processing method for generating prediction signals for a group of reference pictures of all of the reference list numbers is similar to a previously encoded group of information on a processing method for prediction signal generation. FIG. 34 is a schematic showing encoded data when even one piece of information among a group of information on a processing method for generating prediction signal generation for a group of reference pictures of all of the reference list numbers differs from a previously encoded group of information on a processing method for prediction signal generation.

A moving picture encoding method according to the modification example is performed by the encoder 107 to encode prediction signal generation method information. Therefore, processing to encode prediction signal generation method information is described with reference to FIG. 40.

Figure 40:
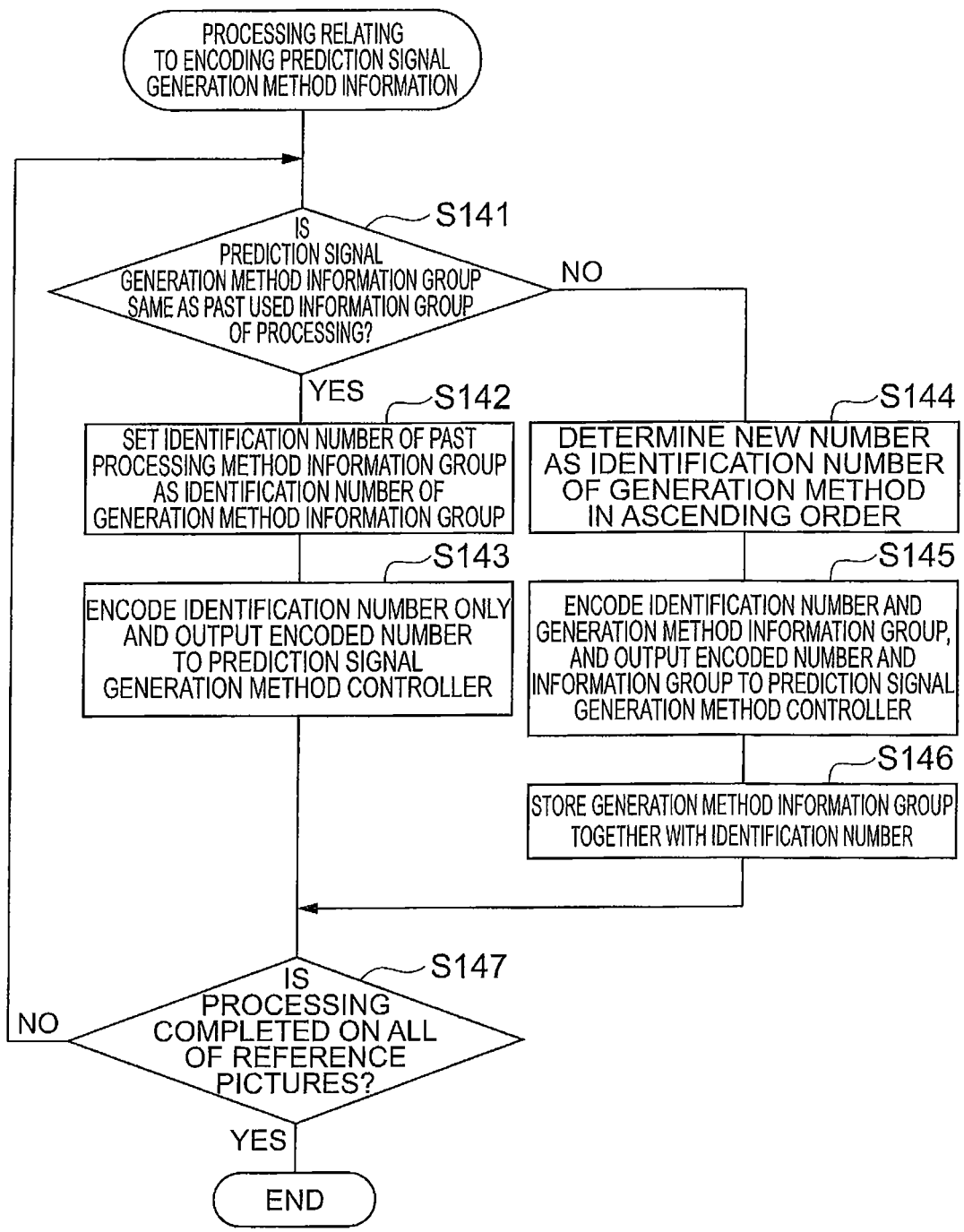
FIG. 40 is a flowchart illustrating an example of processing relating to encoding a prediction signal generation method information group in a modification example 2.

As illustrated in FIG. 40, the encoder 107 determines whether or not a group of information on a processing method performed on each reference picture of a group of reference pictures for prediction signal generation (prediction signal generation method information group) is similar to a previously used group of information on a processing method (step S141). If the prediction signal generation method information group is not similar to a previously used group of information on a processing method (NO in step S141), the encoder 107 determines a new number in ascending order as an identification number of a generation method information group (step S144), encodes the determined new identification number and the prediction signal generation method information group, outputs the encoded number and the information group to the prediction signal generation method controller 102 through the line L113 (step S145), and then stores the prediction signal generation method information group together with the new identification number (step S146).

In contrast, if the prediction signal generation method information group is similar to a previously used group of information on a processing method (YES in step S141), the encoder 107 sets the identification number of the previously used processing method information group as an identification number of the present prediction signal generation method information group (step S142), encodes only the above-described identification number set to the present group and outputs the encoded number to the prediction signal generation method controller 102 through the line L113 (step S143).

Then, the encoder 107 determines whether or not the above-described processing from steps S141 to S146 is completed on all of the groups of reference pictures (step S147). If a group of reference pictures remains unprocessed (NO in step S147), the encoder 107 repeats processing from steps S141 to S146 on the unprocessed group of reference pictures. In contrast, if processing is completed on all of the groups of reference pictures (YES in step S147), the encoder 107 ends processing of FIG. 40.

The structure of a moving picture encoding program according to the modification example 2 is similar to the structure of the moving picture encoding program of the above-described embodiment (FIG. 16). Therefore, description thereof is omitted. In this regard, the operation of the encoder 107, which the encoding module 1907 causes a computer to operate, is according to the modification example 2.

Moving Picture Decoding Device and Moving Picture Decoding Method

Next, a moving picture decoding device according to the modification example 2 of the above-described embodiment is described. The moving picture decoding device according to the modification example 2 of the above-described embodiment is similar to the moving picture decoding device 1000 of the above-described embodiment except for the decoder 1002. Accordingly, only the decoder 1002 is described.

The decoder 1002 stores a previously decoded group of information on a processing method for prediction signal generation together with an identification number. The identification numbers and corresponding groups of information on a processing method for prediction signal generation with respect to all of the reference list numbers that are stored in the decoder 1002 are the same as the aforementioned groups of information illustrated in FIG. 30. The decoder 1002 decodes information on a processing method performed on each reference picture of all of the groups of reference pictures for prediction signal generation before decoding the first target block of a decoding target frame picture from encoded data input through the input unit 101. The encoded data when a group of information on processing methods for prediction signal generation of a group of reference pictures of all of the reference list numbers is the same as a previously encoded group of information on a processing method for prediction signal generation is similar to the aforementioned encoded data illustrated in FIG. 33. The encoded data when at least one piece of information among a group of information on a processing method for prediction signal generation of a group of reference pictures of all of the reference list numbers differs from a previously encoded group information on a processing method for prediction signal generation is similar to the aforementioned encoded data illustrated in FIG. 34. The decoder 1002 decodes, for every decoding target frame picture, an identification number of information on a prediction signal generation method of a group of reference pictures of all of the reference list numbers. Then, the decoder 1002 determines whether or not the decoded identification number is a previously decoded identification number of a group of information on a processing method for prediction signal generation. When the decoded identification number is an identification number of a previously decoded group of a processing method for prediction signal generation, the decoder 1002 outputs a stored group of information on a processing method for prediction signal generation having the same identification number to the prediction signal generation method controller 1003 through the line L1010. When the decoded identification number differs from a previously decoded identification number of a group of information on a processing method for prediction signal generation, the decoder 1002 decodes a subsequent code so as to acquire information on processing methods for prediction signal generation with respect to a group of reference pictures of all of the reference list numbers, and outputs the acquired information to the prediction signal generation method controller 1003 through the line L1010. At this time, the decoder 1002 stores a newly decoded group of information on a processing method for prediction signal generation together with the decoded identification number. Then, the decoder 1002 decodes, for every target block of a decoding target frame picture, reference list numbers of a group of reference pictures used for prediction signal generation, and outputs the decoded reference list numbers to the prediction signal generation method controller 1003 and the frame memory 1004 through the line L1011. Then, the decoder 1002 decodes a motion vector used for prediction signal generation, and outputs the decoded motion vector to the frame memory 1004 through the line L1012. Then, the decoder 1002 decodes quantized transform coefficients of residual signal, and outputs the decoded signal to the de-quantization/inverse-transform unit 1006.

A moving picture decoding method according to the modification example 2 is performed by the decoder 1002 to decode prediction signal generation method information. Therefore, processing to decode prediction signal generation method information is described with reference to FIG. 41.

Figure 41:
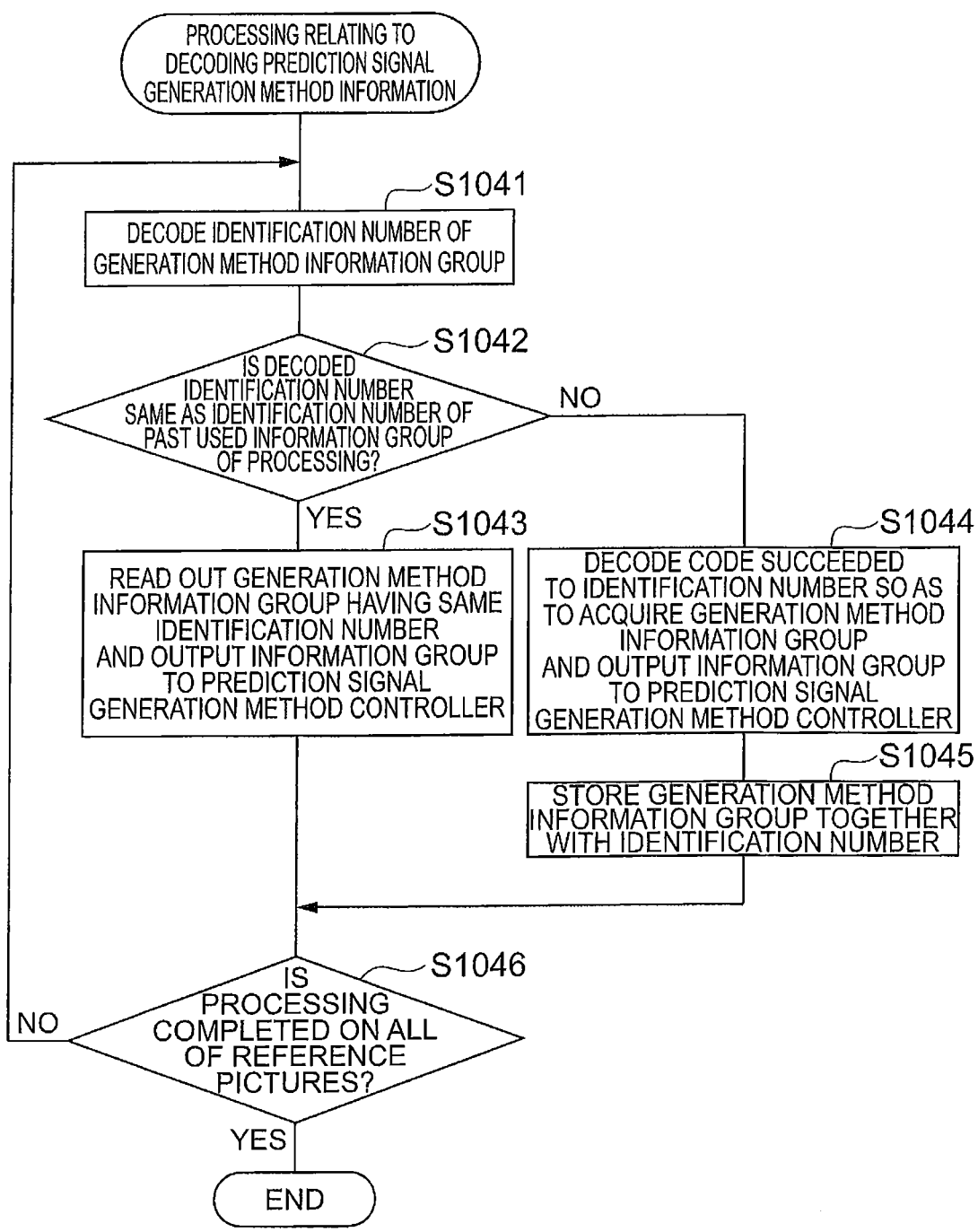
FIG. 41 is a flowchart illustrating an example of processing relating to decoding a prediction signal generation method information group in the modification example 2.

As illustrated in FIG. 41, the decoder 1002 decodes an identification number of a prediction signal generation method information group on a certain group of reference pictures (step S1041), and determines whether or not the decoded identification number is the same as a previously used identification number of a group of information on a processing method (step S1042). If the decoded identification number is not the same as a previously used identification number of a group of information on a processing method (NO in step S1042), the decoder 1002 decodes a code succeeding the identification number so as to acquire a prediction signal generation method information group, outputs the acquired information group to the prediction signal generation method controller 1003 through the line L1010 (step S1044), and stores the prediction signal generation method information group together with the identification number (step S1045).

In contrast, if the decoded identification number is the same as a previously used identification number of a group of information on a processing method (YES in step S1042), the decoder 1002 reads out a stored prediction signal generation method information group having the same identification number, and outputs the information group to the prediction signal generation method controller 1003 through the line L1010 (step S1043).

Then, the decoder 1002 determines whether or not the above-described processing from steps S1041 to S1045 is completed on all of the groups of reference pictures (step S1046). If a group of reference pictures remains unprocessed (NO in step S1046), the decoder 1002 repeats processing from steps S1041 to S1045 on the unprocessed group of reference pictures. In contrast, if processing is completed on all of the groups of reference pictures (YES in step S1046), the decoder 1002 ends processing of FIG. 41.

The structure of a moving picture decoding program according to the modification example 2 is similar to the structure of the moving picture decoding program of the above-described embodiment (FIG. 17). Therefore, description thereof is omitted. In this regard, the operation of the decoder 1002, upon which the decoding module 2002 causes a computer to operate is according to the modification example 2.

Operations and Effects of the Modification Example 2

Here, the operations and effects of the moving picture encoding device 100 are described. In the moving picture encoding device 100, when prediction-encoding a target block of an encoding target frame picture, the prediction signal generation method controller 102 determines a processing method by which a residual signal becomes minimum by combining a plurality of predetermined processes for every reference picture of a group of reference pictures, and the prediction signal generator 104 performs processing on each reference picture of the group of reference pictures based on the determined processing method so as to generate a prediction signal, thereby enabling provision of a preferred prediction signal suitable for a target block of an encoding target frame picture and performance of encoding with high efficiency. In addition, the encoder 107 encodes, for every frame picture, a group of information on a processing method for prediction signal generation for all of the groups of reference pictures together with an identification number, and encodes only the identification number when the group of information is the same as a previously encoded group of information on a processing method for prediction signal generation. As a result, the encoder 107 can encode information regarding processing for producing a group of reference pictures with less encoded data.

The operations and effects of the moving picture decoding device 1000 are described. In the moving picture decoding device 1000, when prediction-decoding a target block of a decoding target frame picture, the prediction signal generation method controller 1003 decodes a group of information on a processing method by which a residual signal becomes minimum for every group of reference pictures, and the prediction signal generator 1005 performs processing on each reference picture of the group of reference pictures based on the decoded processing method so as to generate a prediction signal, thereby enabling provision of a preferred group of reference pictures suitable for a target block of a decoding target frame picture and performance of decoding with high efficiency. In addition, the decoder 1002 decodes, for every frame picture, a group of information on a processing method for prediction signal generation for all of the groups of reference pictures together with an identification number, and decodes only the identification number when the group of information is the same as a previously decoded group of information on a processing method for prediction signal generation. As a result, the decoder 1002 can decode information for producing a group of reference pictures with less encoded data.

In the moving picture encoding device and the moving picture decoding device according to the modification example 2 of the present embodiment, the encoder 107 and the decoder 1002 may preliminarily store in common some identification numbers and corresponding groups of information on a processing method for prediction signal generation. Accordingly, the case where only an identification number needs to be encoded and decoded as reference picture generation method encoded data increases. The moving picture encoding device can encode a group of information on a processing method for producing a group of reference pictures with less encoded data. The moving picture decoding device can decode a group of information on a processing method for producing a group of reference pictures with less encoded data. Alternatively, an identification number and corresponding group of information on a processing method for prediction signal generation may be stored in common in the encoder 107 and the decoder 1002 by a different method from being encoded and decoded so as to be included in encoded data.

Figure 35:
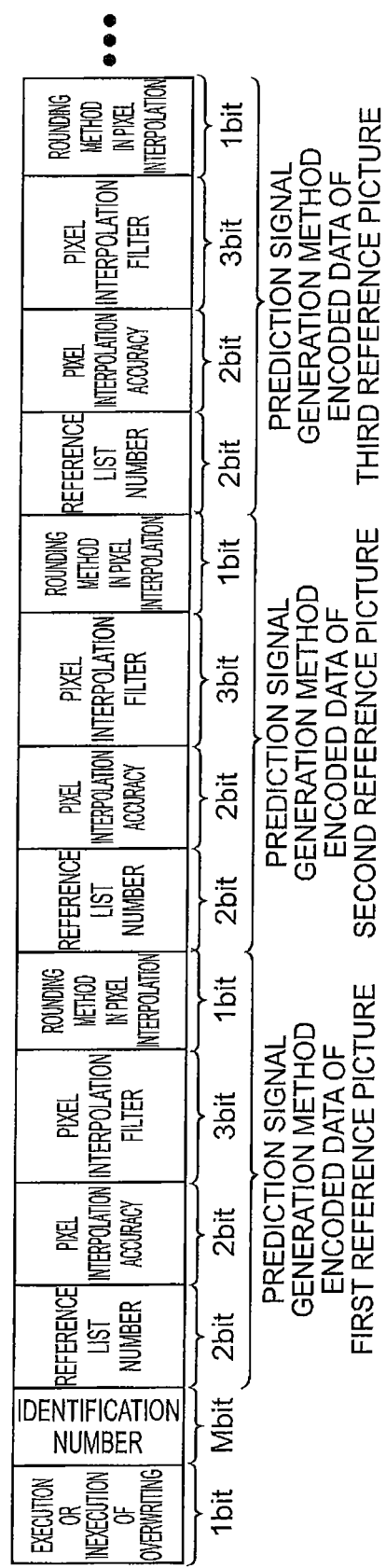
FIG. 35 is a schematic of an example of prediction signal generation method encoded data.

In the moving picture encoding device and the moving picture decoding device according to the modification example 2 of the present embodiment, even when an encoded and decoded identification number and corresponding group of information on a processing method for prediction signal generation differ from a previously encoded and decoded identification number and corresponding group of information on a processing method for prediction signal generation, an encoded and decoded identification number and corresponding group of information may overwrite the previously encoded and decoded identification number and corresponding group of information on a processing method for prediction signal generation to avoid a new identification number being added to the encoder 107 and the decoder 1002. In this case, prediction signal generation method encoded data includes, in front of a code of an identifier, information on whether or not an overwriting is executed on an existing identifier number and corresponding group of information on a processing method for prediction signal generation. The moving picture encoding device encodes and adds the information using the encoder 107 while the moving picture decoding device decodes the information using the decoder 1002. FIG. 35 is a schematic of prediction signal generation method encoded data including information on whether or not an overwriting is executed on an existing identifier number and a corresponding group of information on a processing method for prediction signal generation. Accordingly, when the number of types of groups of information on a processing method for producing a group of reference pictures increases, an identification number can be reutilized by being overwritten. As a result, new identification numbers do not need to increase, and an identification number can be encoded and decoded with a short code length.

Figure 36:
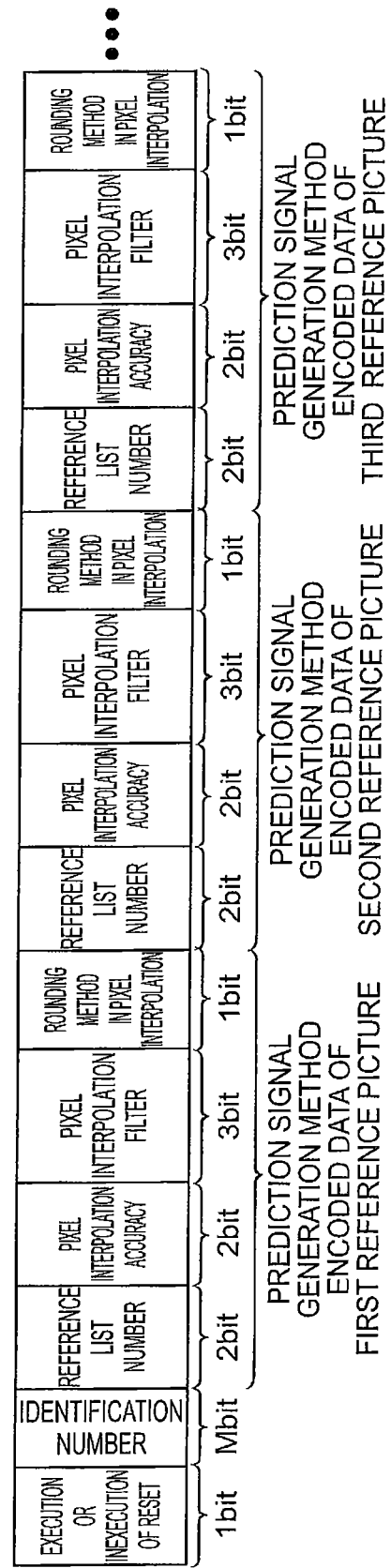
FIG. 36 is a schematic of an example of prediction signal generation method encoded data.

In the moving picture encoding device and the moving picture decoding device according to the modification example 2 of the present embodiment, information to entirely reset previously encoded and decoded identification number and a corresponding group of information on a processing method for prediction signal generation stored in the encoder 107 and the decoder 1002 to an initial state may be included in prediction signal generation method encoded data. Encoding and decoding may be performed on the prediction signal generation method encoded data. FIG. 36 is a schematic of prediction signal generation method encoded data including information to entirely reset previously encoded and decoded identification number and a corresponding group of information on a processing method for prediction signal generation to an initial state. Accordingly, a previously encoded and decoded group of information on a processing method for prediction signal generation can be initialized one time so as to be used for subsequent encoding and decoding without sequentially being overwritten.

Figure 37:
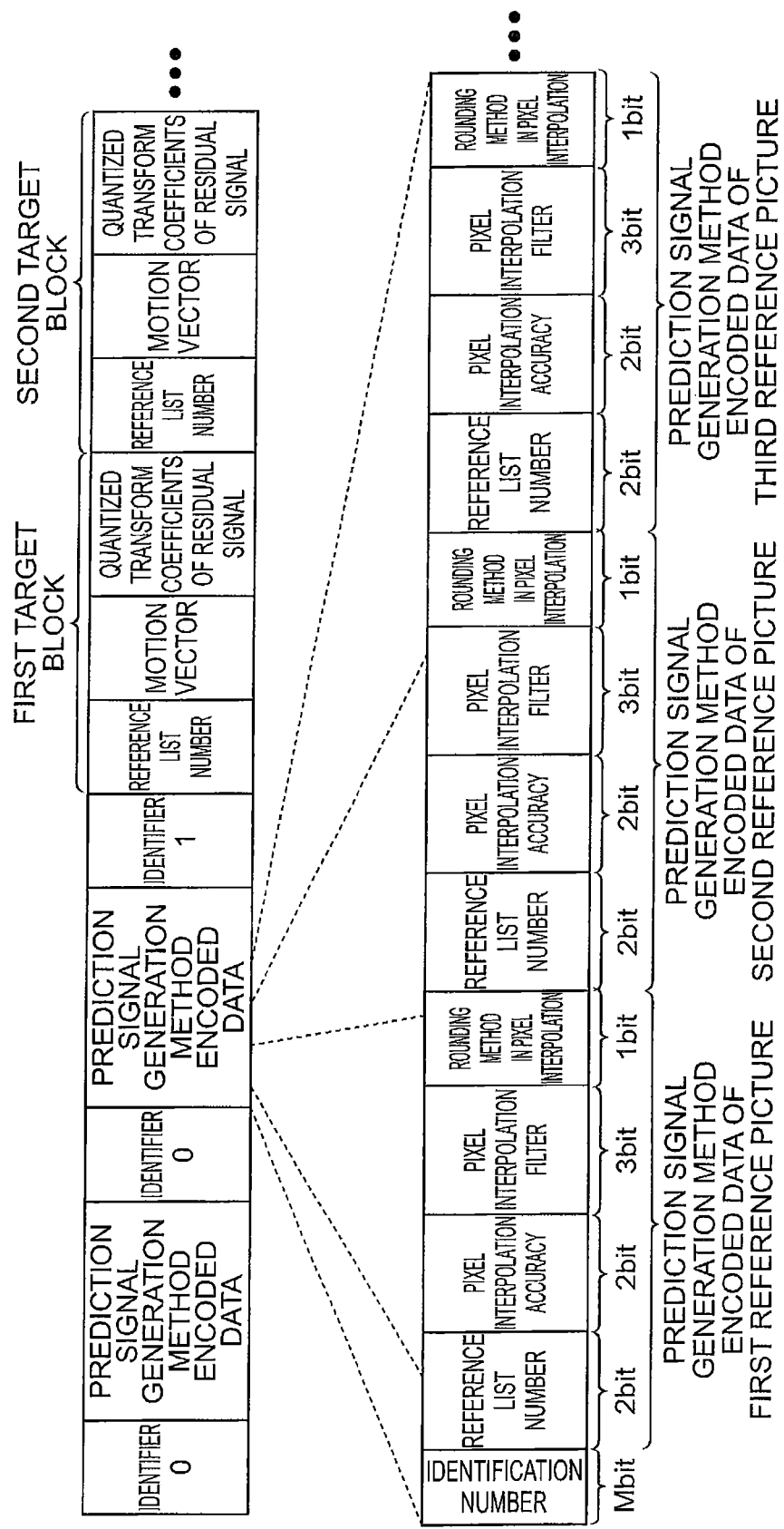
FIG. 37 is an example of a schematic of encoded data.

In the moving picture encoding device and the moving picture decoding device according to the modification example 2 of the present embodiment, the encoder 107 encodes and outputs the data representing a prediction signal generation method once for a respective frame picture. But the moving image encoding/decoding system is not limited thereto. The encoder 107 may encode and output the data representing a prediction signal generation method once for a plurality of frame pictures or at multiple times for a respective frame picture The decoder 1002 decodes the data representing a prediction signal generation method once for a respective frame picture to be decoded. But the moving image encoding/decoding system is not limited thereto. The decoder 1002 may decode the data representing a prediction signal generation method once for a plurality of frame pictures or at multiple times for a respective frame picture. In this case, the encoder 107 inserts an identifier identifying a type of encoded data in front of the data representing a prediction signal generation method and a code of a reference list number of the first target block. Specifically, the encoder 107 inserts a code "0" when the subsequent code is the data representing a prediction signal generation method or inserts a code "1" when the subsequent code is a reference list number that is the beginning of encoded data of a target block. The decoder 1002 decodes, for a respective frame picture, the identifier identifying a type of encoded data before decoding a reference list number of the first target block. While decoding, the decoder 1002 recognizes that the subsequent code is the data representing a prediction signal generation method when the code is "0" or recognizes that the subsequent code is a reference list number that is encoded data of a target block when the code is "1". FIG. 37 is a schematic showing encoded data when the data representing a prediction signal generation method is encoded and decoded at multiple times for a respective frame picture. Accordingly, an amount of data to be encoded and decoded can be reduced when a group of information on a processing method for producing a group of reference pictures is encoded and decoded once for a plurality of frame pictures. When a group of information on a processing method for producing reference pictures is encoded or decoded at a plurality of times all at once, the group of information on a processing method for producing a reference picture is encoded or decoded all at once before some frame pictures are encoded or decoded. As a result, a processing can proceed without performing different processes alternatively.

As another example of the aforementioned table relating to a pixel interpolation filter of FIG. 14(b), the table illustrated in FIG. 44 can be cited. In the table illustrated in FIG. 44, a list of a type of pixel interpolation filter includes list numbers 0, 1, 2, and 3. An H.264 interpolation filter (S_FIF) is allocated to the list number 0. An SAIF_HALF interpolation filter is allocated to the list number 1. The list numbers 2 and 3 are "Reserved" (to be determined).

As another example of FIG. 23 (table illustrating information on a combination of processes for generating a prediction signal), the table illustrated in FIG. 45 can be cited. In the table illustrated in FIG. 45, a list number of a pixel interpolation accuracy, a list number of a type of pixel interpolation filter, a list number of execution or non-execution of luminance compensation, and a list number of a calculation rounding method in pixel interpolation are stored as information on a combination of processing methods corresponding to each identification number. Such information described in FIG. 45 is also called a RPPS (Reference Picture Processing Set), and includes information necessary for producing a reference picture used for prediction signal generation. The RPPS is processed in decoding processing as follows, for example. First, an RPPS type rpps_type indicating a type of RPPS is decoded. When the RPPS type rpps_type is not 0, an identification number (rpps_id) and information on a combination of processing methods corresponding to the identification number are decoded and stored. In contrast, when the RPPS type rpps_type is 0, an identification number (rpps_id) for decoding a present frame is decoded, reconstructed information (information on a combination of processes) of FIG. 45 corresponding to the identification number is read out, and a reference picture used for prediction signal generation is produced based on the information on a combination of processes. The information described in FIG. 45 is a default value. The information is overwritten with new information on a combination of processing methods decoded and obtained when the RPPS type rpps_type is not 0.

REFERENCE SIGNS LIST

10: recording medium; 12: reader; 14: working memory; 16: memory; 18: display; 30: computer; 40: computer data signal; 100: moving picture encoding device; 101: input unit; 102: prediction signal generation method controller; 103: frame memory; 104: prediction signal generator; 105: subtractor; 106: transform/quantization unit; 107: encoder; 108: de-quantization/inverse-transform unit; 109: adder; 110: output unit; 1000: moving picture decoding device; 1001: input unit; 1002: decoder; 1003: prediction signal generation method controller; 1004: frame memory; 1005: prediction signal generator; 1006: de-quantization/inverse-transform unit; 1007: adder; 1008: output unit; 190: moving picture encoding program; 1900: main module; 1901: input module; 1902: prediction signal generation method control module; 1903: storage module; 1904: prediction signal generation module; 1905: subtraction module; 1906: transform/quantization module; 1907: encoding module; 1908: de-quantization/inverse-transform module; 1909: adding module; 1910: output module; 200: moving picture decoding program; 2000: main module; 2001: input module; 2002: decoding module; 2003: prediction signal generation method control module; 2004: storage module; 2005: prediction signal generation module; 2006: de-quantization/inverse-transform module; 2007: adding module; and 2008: output module.

The invention claimed is:

1. A moving picture encoding device that divides an encoding target picture into a plurality of target blocks and performs prediction encoding in which a prediction signal is generated for a respective target block with reference to one reference picture of a plurality of reference pictures, the moving picture encoding device comprising:
   a processor;
   a prediction signal generation method controller unit that is executable by the processor to select one of a plurality of processes from each of a plurality of respective types of predetermined processes to determine, for each of the respective reference pictures, a processing method, the processing method to be performed to generate a prediction signal, and also executable to determine, for each of the respective target blocks, a motion vector and one reference picture, the determined one reference picture having a corresponding reference list number identifying the determined one reference picture, the plurality of types of predetermined processes comprising: pixel interpolation processes indicative of integer pixel accuracy or a level of fractional pixel interpolation accuracy, and types of pixel interpolation filters used to generate the prediction signal with said integer pixel accuracy or said level of fractional pixel interpolation accuracy;
   a prediction signal generator unit that is executable by the processor to process the determined one reference picture, using the determined processing method, to generate a prediction signal for the respective target blocks; and
   an encoder unit that is executable by the processor to encode, for each of the respective target blocks, information on the determined processing method in association with the reference list number identifying the determined one reference picture, and motion vector information.

2. The moving picture encoding device according to claim 1, wherein the prediction signal generation method controller unit is further executable by the processor to select, for a respective reference picture, the one of the plurality of processes from each of the plurality of respective types of predetermined processes such that the processing method yields a minimum error between a target block and the prediction signal to be obtained for the target block.

3. The moving picture encoding device according to claim 1, wherein the prediction signal generation method controller unit is further executable to perform motion prediction for each of the respective target blocks to determine, for each of the respective target blocks, the motion vector and the one reference picture having a minimum prediction error.

4. The moving picture encoding device according to claim 1, wherein the encoder unit is further executable by the processor to store, for the respective reference pictures, the information on the determined processing method in association with a respective reference list number.

5. A moving picture decoding device that performs prediction decoding for respective target blocks obtained from dividing a decoding target picture, a prediction signal is generated with reference to one reference picture of a plurality of reference pictures, the moving picture decoding device comprising:

a processor;

a decoder unit that is executable by the processor to decode, from input encoded data, information on a processing method to be performed on a reference picture to generate the prediction signal, a reference list number identifying the reference picture, and motion vector information of a respective target block, wherein the processing method corresponds to the reference list number and comprises a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

a prediction signal generation method controller unit that is executable by the processor to acquire information on the processing method to be performed on the reference picture corresponding to the reference list number, the information on the processing method acquired based on the reference list number of the target block decoded by the decoder unit; and a prediction signal generator unit that is executable by the processor to generate the prediction signal for the target block by processing the reference picture, using the processing method to be performed on the reference picture for the target block, the processing method acquired by the prediction signal generation method controller unit.

6. The moving picture decoding device according to claim 5, wherein the combination is selected as the processing method so as to yield a minimum error between the target block and the prediction signal for the target block, which is obtained by application of the processing method to the reference picture.

7. The moving picture decoding device according to claim 5, wherein the decoder unit is further executable by the processor to store, for the respective reference picture, information on the acquired processing method in association with the reference list number.

8. A moving picture encoding method performed by a moving picture encoding device for prediction coding in which an encoding target picture is divided into a plurality of target blocks, and a prediction signal is generated for the respective target blocks with reference to one reference picture included among a plurality of reference pictures, the moving picture encoding method comprising:

selecting and combining a plurality of predetermined processes with a processor to determine, for the respective reference pictures, a processing method to be performed to generate a respective prediction signal, the predetermined processes comprising a selected one of a plurality of different pixel interpolation processes indicative of integer pixel accuracy or a level of fractional pixel interpolation accuracy, and a selected one of a plurality of different types of predetermined pixel interpolation filters processes used to generate the prediction signal with said integer pixel accuracy or said level of fractional pixel interpolation accuracy;

performing motion prediction with the processor to determine a respective motion vector and a respective reference picture for each of the respective target blocks, the determined reference picture having a reference list number;

processing the determined respective reference picture with the processor using the determined processing method to generate the respective prediction signal for each of the respective target blocks; and encoding, for each of the respective target blocks, information on the determined processing method in association with the reference list number identifying the determined reference picture and motion vector information.

9. A moving picture decoding method performed by a moving picture decoding device for prediction decoding in which, for respective target blocks obtained from dividing a decoding target picture, a prediction signal is generated with reference to one reference picture of a plurality of reference pictures, the moving picture decoding method comprising:

decoding with a processor, from input encoded data, information on a processing method to be performed on a reference picture to generate the prediction signal, and a reference list number identifying the reference picture and motion vector information of a target block, wherein the processing method corresponds to the reference list number and comprises a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

acquiring with the processor, using the reference list number of the target block, the information on the corresponding processing method to be performed on the reference picture corresponding to the reference list number; and generating the prediction signal for the target block with the processor by processing the reference picture using the processing method to be performed on the reference picture for the target block.

10. A non-transitory computer readable storage medium for a moving image encoding/decoding system, the computer readable storage medium comprising instructions executed by a computer for performing prediction coding in which an encoding target picture is divided into a plurality of target blocks, and for the respective target blocks, a prediction signal is generated with reference to one reference picture of a plurality of reference pictures, the instructions comprising:

instructions to select and combine a plurality of predetermined processes to determine, for the respective reference pictures, a processing method to be performed to generate a prediction signal, the processing method comprises a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

instructions to perform motion prediction to determine a respective motion vector and a respective reference picture for each of the respective target blocks, the determined reference picture having a reference list number;

instructions to process the determined reference picture, using the determined processing method, to generate the prediction signal for each of the respective target blocks; and instructions to encode for each of the respective target blocks, information on the determined processing method in association with the reference list number identifying the determined reference picture and motion vector information.

11. A non-transitory computer readable storage medium for an image encoding/decoding system, the computer readable storage medium comprising instructions executed by a computer for performing prediction decoding in which for respective target blocks obtained from dividing a decoding target picture, a prediction signal is generated with reference to one reference picture of a plurality of reference pictures, the instructions comprising:

instructions to decode, from input encoded data, information on a processing method to be performed on a reference picture to generate a prediction signal, a reference list number of a target block, and motion vector information, wherein the reference list number identifies the reference picture and corresponds to the processing method, the processing method comprising a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

instructions to acquire, using the reference list number of the target block, information on the processing method to be performed on the reference picture corresponding to the reference list number; and instructions to generate the prediction signal for the target block by processing the reference picture using the corresponding processing method to be performed on the reference picture for the decoding target block.

12. A moving picture encoding device that performs prediction coding in which an encoding target picture is divided into a plurality of target blocks, and a prediction signal is generated for each of the respective target blocks with reference to one set of a group of reference pictures among a plurality of sets of groups of reference pictures, the moving picture encoding device comprising:

a processor;

a prediction signal generation method controller unit executable by the processor to select one of a plurality of processes from each of a plurality of respective types of predetermined processes, the processes are selected and combined by the processor to determine a processing method to be performed on a corresponding reference picture included within the group of reference pictures to generate the prediction signal for a respective target block, the plurality of types of predetermined processes comprising: pixel interpolation processes indicative of integer pixel accuracy or a level of fractional pixel interpolation accuracy, and types of pixel interpolation filters used to generate the prediction signal with said integer pixel accuracy or said level of fractional pixel interpolation accuracy, and the prediction signal generation method controller unit is further executable by the processor to perform motion prediction to determine, for each of the respective target blocks, a respective motion vector and a reference list number of the corresponding reference picture, and also identify the group of reference pictures from among the plurality of sets of groups of reference pictures;

a prediction signal generator unit that is executable by the processor to generate the prediction signal for the respective target block by processing the corresponding reference picture included within the identified group of reference pictures using the determined processing method; and an encoder unit that is executable by the processor to encode, for the respective target blocks, the selected one of the plurality of processes from each of the plurality of respective types of predetermined processes that were combined to form the determined processing method, in association with a respective group of the reference list numbers identifying the group of determined reference pictures and motion vector information.

13. A moving picture decoding device that performs prediction decoding in which for respective target blocks obtained from dividing a decoding target picture, a prediction signal is generated with reference to one set of a group of reference pictures among a plurality of sets of groups of reference pictures, the moving picture decoding device comprising:

a processor;

a decoder unit that is executable by the processor to decode, from input encoded data of a decoding target block, a group of information representing a plurality of processing methods of the decoding target block, a group of reference list numbers identifying the one set of the group of reference pictures, and motion vector information of the decoding target block, wherein each of the processing methods represented in the group of information corresponds to a respective reference list number included in the group of reference list numbers, and each of the processing methods comprises a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

a prediction signal generation method controller unit that is executable by the processor to acquire, using the group of reference list numbers a corresponding processing method represented in the group of information, the corresponding processing method to be performed on a reference picture included in the identified one set of the group of reference pictures; and a prediction signal generator unit executable by the processor to generate the prediction signal for the decoding target block by processing each reference picture within the identified set of reference pictures based on the corresponding processing method.

14. A moving picture encoding method performed by a moving picture encoding device for prediction encoding in which an encoding target picture is divided into a plurality of target blocks, and a prediction signal is generated for the respective target blocks with reference to one set of a group of reference pictures among a plurality of sets of groups of reference pictures, the moving picture encoding method comprising:

a processor selecting one of a plurality of processes from each of a plurality of respective types of predetermined processes to determine a processing method, the processing method to be performed for each target block to generate a prediction signal from a reference picture included in the plurality of sets of groups of reference pictures, the plurality of types of predetermined processes comprising: pixel interpolation processes indicative of integer pixel accuracy or a level of fractional pixel interpolation accuracy, and types of pixel interpolation filters used to generate the prediction signal with said integer pixel accuracy or said level of fractional pixel interpolation accuracy;

performing motion prediction, with the processor, for every target block to determine a motion vector and a group of reference pictures for the respective target blocks;

the processor associating the processing method performed for each target block with a reference list number of a respective determined reference picture from among the determined group of reference pictures;

processing, with the processor, the determined reference picture included in the determined group of reference pictures using the determined processing method to generate a prediction signal for the respective target blocks; and encoding with the processor, for the respective target blocks, a group of information on the determined processing method associated with the group of reference pictures, together with motion vector information and a group of reference list numbers identifying the group of reference pictures.

15. A moving picture decoding method performed by a moving picture decoding device for prediction decoding in which for respective target blocks obtained from dividing a decoding target picture, a prediction signal is generated with reference to one set of a group of reference pictures among a plurality of sets of groups of reference pictures, the moving picture decoding method comprising:

a processor decoding, from input encoded data, motion vector information of the target blocks, a group of information on a processing method to be performed on each reference picture of a group of reference pictures to generate the prediction signal, and a group of reference list numbers respectively identifying the group of reference pictures, wherein each reference list number included in the group of reference list numbers is associated with a respective processing method in the group of information to identify the respective processing method to be performed on each reference picture identified with the group of reference list numbers, each respective processing method comprising a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

acquiring with the processor, from the group of information, the respective processing method for a respective target block, the respective processing method to be performed on a reference picture included in the group of reference pictures, wherein the reference picture is identified with a reference list number included in the group of reference list numbers, which is associated with the respective processing method; and generating the prediction signal for the respective target block by processing the reference picture using the respective processing method.

16. A non-transitory computer readable storage medium for a moving image encoding/decoding system, the computer readable storage medium comprising instructions executed by a computer for performing prediction encoding in which an encoding target picture is divided into a plurality of target blocks, and for the respective target blocks, a prediction signal is generated with reference to one set of a group of reference pictures among a plurality of sets of groups of reference pictures, the instructions comprising:

instructions to select one of a plurality of processes from each of a plurality of respective types of predetermined processes to determine a processing method, the processing method to be performed on a corresponding reference picture included within the group of reference pictures to generate the prediction signal for a respective target block, the plurality of respective types of predetermined processes comprising: pixel interpolation processes indicative of integer pixel accuracy or a level of fractional pixel interpolation accuracy, and types of pixel interpolation filters used to generate the prediction signal with said integer pixel accuracy or said level of fractional pixel interpolation accuracy;

instructions to perform motion prediction to determine, for each of the respective target blocks, a respective motion vector and a reference list number of the corresponding reference picture, and also identify the group of reference pictures from among the plurality of sets of groups of reference pictures;

instructions to process the reference picture included within the group of reference pictures to generate the prediction signal for the respective target block using the determined processing method to be performed on the reference picture of the group of reference pictures for the respective target blocks; and instructions to encode, for the respective target blocks, motion vector information, the selected one of the plurality of processes from each of the plurality of respective types of predetermined processes that were combined to form the determined processing method on the determined group of reference pictures, in association with a respective group of the reference list numbers which respectively identify reference pictures within the group of reference pictures.

17. A non-transitory computer readable storage medium for an image encoding/decoding system, the computer readable storage medium comprising instructions executed by a computer for performing prediction decoding in which, for respective target blocks obtained from dividing a decoding target picture, a prediction signal is generated with reference to one set of a group of reference pictures among a plurality of sets of groups of reference pictures, the instructions comprising:

instructions to decode, from input encoded data of a decoding target block, a group of information representing a plurality of processing methods, a group of reference list numbers identifying the one set of the group of reference pictures, and motion vector information of every decoding target block, wherein each of the processing methods represented in the group of information corresponds to a respective reference list number included in the group of reference list numbers, and comprises a combination of a selected one of a plurality of different predetermined pixel interpolation processes indicative of integer pixel accuracy or a level of fractional pixel interpolation accuracy, and a selected one of a plurality of different types of predetermined pixel interpolation filters used to generate the prediction signal with said integer pixel accuracy or said level of fractional pixel interpolation accuracy;

instructions to acquire, using the group of reference list numbers a corresponding processing method represented in the group of information, the corresponding processing method to be performed on a reference picture included in the identified one set of the group of reference pictures; and a prediction signal generator that generates the prediction signal for the decoding target block by processing the reference picture within the identified set of reference pictures, using the corresponding processing method.

* * * * *